(12) United States Patent
Wells et al.

(10) Patent No.: US 7,881,931 B2
(45) Date of Patent: Feb. 1, 2011

(54) AUTOMATIC IDENTIFICATION OF SOUND RECORDINGS

(75) Inventors: Maxwell Wells, Seattle, WA (US);
Vidya Venkatachalam, Bellevue, WA (US); Luca Cazzanti, Bellevue, WA (US); Kwan Fai Cheung, Bellevue, WA (US); Navdeep Dhillon, Seattle, WA (US); Somsak Sukittanon, Seattle, WA (US)

(73) Assignee: Gracenote, Inc., Emeryville, CA (US)

( * ) Notice: Subject to any disclaimer, the term of this patent is extended or adjusted under 35 U.S.C. 154(b) by 227 days.

(21) Appl. No.: 12/025,373

(22) Filed: Feb. 4, 2008

(65) Prior Publication Data

US 2008/0201140 A1    Aug. 21, 2008

Related U.S. Application Data

(63) Continuation of application No. 10/200,034, filed on Jul. 22, 2002, now Pat. No. 7,328,153.

(60) Provisional application No. 60/306,911, filed on Jul. 20, 2001.

(51) Int. Cl.
*G10L 15/06* (2006.01)
(52) U.S. Cl. .................. 704/243; 704/245
(58) Field of Classification Search ............... 704/243, 704/245, 246, 251
See application file for complete search history.

(56) References Cited

U.S. PATENT DOCUMENTS

| | | |
|---|---|---|
| 4,843,562 A | 6/1989 | Kenyon et al. |
| 5,262,940 A | 11/1993 | Sussman |
| 5,400,261 A | 3/1995 | Reynolds |
| 5,437,050 A | 7/1995 | Lamb et al. |
| 5,510,572 A | 4/1996 | Hayashi et al. |
| 5,536,902 A | 7/1996 | Serra et al. |
| 5,539,635 A | 7/1996 | Larson, Jr. |
| 5,574,686 A | 11/1996 | Watsuji et al. |
| 5,581,658 A | 12/1996 | O'Hagan et al. |
| 5,616,876 A | 4/1997 | Cluts |

(Continued)

FOREIGN PATENT DOCUMENTS

EP    1197020 B1    11/2007

(Continued)

OTHER PUBLICATIONS

"Japan Application Serial No. 2003-514541, Office Action Mailed on Jan. 6, 2009", 7 pgs.

(Continued)

*Primary Examiner*—Michael N Opsasnick
(74) *Attorney, Agent, or Firm*—Schwegman Lundberg & Woessner, P.A.

(57) ABSTRACT

Copies of original sound recordings are identified by extracting features from the copy, creating a vector of those features, and comparing that vector against a database of vectors. Identification can be performed for copies of sound recordings that have been subjected to compression and other manipulation such that they are not exact replicas of the original. Computational efficiency permits many hundreds of queries to be serviced at the same time. The vectors may be less than 100 bytes, so that many millions of vectors can be stored on a portable device.

32 Claims, 20 Drawing Sheets

U.S. PATENT DOCUMENTS

| | | | |
|---|---|---|---|
| 5,671,330 | A | 9/1997 | Sakamoto et al. |
| 5,918,223 | A | 6/1999 | Blum et al. |
| 6,219,639 | B1 * | 4/2001 | Bakis et al. ............ 704/246 |
| 6,505,160 | B1 | 1/2003 | Levy et al. |
| 6,609,093 | B1 * | 8/2003 | Gopinath et al. ........... 704/236 |
| 6,829,368 | B2 | 12/2004 | Meyer et al. |
| 6,931,351 | B2 * | 8/2005 | Verma et al. ............ 702/182 |
| 6,941,275 | B1 | 9/2005 | Swierczek |
| 6,990,453 | B2 * | 1/2006 | Wang et al. ............ 704/270 |
| 7,013,301 | B2 * | 3/2006 | Holm et al. ............ 707/741 |
| 7,302,574 | B2 | 11/2007 | Conwell et al. |
| 7,328,153 | B2 * | 2/2008 | Wells et al. ............ 704/231 |
| 7,349,552 | B2 | 3/2008 | Levy et al. |
| 7,415,129 | B2 | 8/2008 | Rhoads |
| 7,461,136 | B2 | 12/2008 | Rhoads |
| 7,487,180 | B2 * | 2/2009 | Holm et al. ............ 1/1 |
| 7,529,659 | B2 * | 5/2009 | Wold ............ 704/200 |
| 7,587,602 | B2 | 9/2009 | Rhoads |
| 7,590,259 | B2 | 9/2009 | Levy et al. |
| 2001/0044719 | A1 * | 11/2001 | Casey ............ 704/245 |
| 2005/0038819 | A1 * | 2/2005 | Hicken et al. ............ 707/104.1 |
| 2006/0015338 | A1 * | 1/2006 | Poussin ............ 704/251 |
| 2007/0198262 | A1 * | 8/2007 | Mindlin et al. ............ 704/246 |
| 2008/0187188 | A1 * | 8/2008 | Beletski et al. ............ 382/124 |

FOREIGN PATENT DOCUMENTS

| | | |
|---|---|---|
| WO | WO-0104870 A1 | 1/2001 |
| WO | WO-0111496 A2 | 2/2001 |
| WO | WO-0211123 A2 | 2/2002 |
| WO | WO-03009277 A2 | 1/2003 |
| WO | WO-03009277 A3 | 1/2003 |

OTHER PUBLICATIONS

"Korean Application No. 10-2004-7000980, Office Action Mailed Feb. 11, 2009", 5 pgs.

"U.S. Appl. No. 10/200,034, Advisory Action mailed Jun. 5, 2007", 3 pgs.

"U.S. Appl. No. 10/200,034, Final Office Action mailed Jan. 3, 2007", 25 pgs.

"U.S. Appl. No. 10/200,034, Non-Final Office Action mailed May 31, 2006", 18 pgs.

"U.S. Appl. No. 10/200,034, Notice of Allowance mailed Sep. 14, 2007", 11 pgs.

"U.S. Appl. No. 10/200,034, Response filed May 3, 2007 to Final Office Action mailed Jan. 3, 2007", 17 pgs.

"U.S. Appl. No. 10/200,034, Response filed Oct. 2, 2006 to Non-Final Office Action mailed May 31, 2006", 22 pgs.

"International Application Serial No. PCT/US02/23101, International Preliminary Examination Report mailed Feb. 3, 2004", 24 pgs.

"Japanese Application Serial No. 2003-514541, Office Action mailed May 7, 2008", 8 pgs.

"Korean Application Serial No. 10-2004-7000980, Office Action mailed Aug. 14, 2008", 15 pgs.

"The Current State and Perspective of Speech Recognition Technology", *Journal of Korean Institute of Information Scientists and Engineers*, vol. 11, Iss 5, (Oct. 1993), 22-34.

Foote, Jonathan T, "Content-Based Retrieval of Music and Audio", *Proc. Of the SPIE*, Bellingham, US, (1997), pp. 138-147.

Fumitada, I., "Minimum Prediction Residual Principle Applied to Speech Recognition", *IEEE Transactions on Acoustics, Speech, and Signal Processing*, ASSP-23 (1), (1975), 67-72.

Wold, E., "Content-based classification, search,. and retrieval of audio", *IEEE MultiMedia*, 3(3), (Fall 1996), 27-36.

"Japan Application serial No. 2003-514541 ,Office action Mailed on Oct. 9, 2009", 1 pg.

* cited by examiner

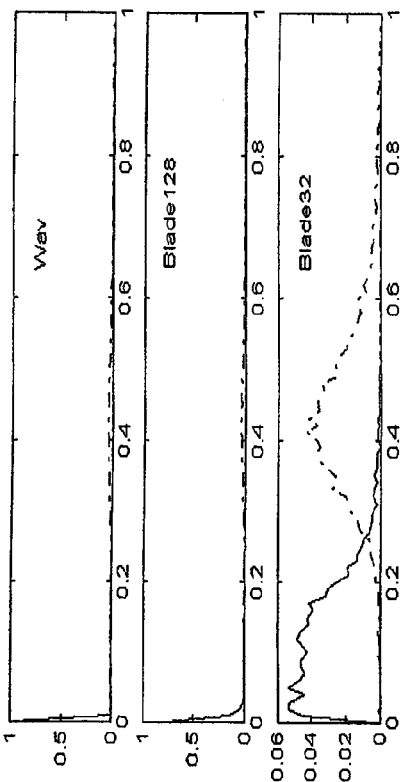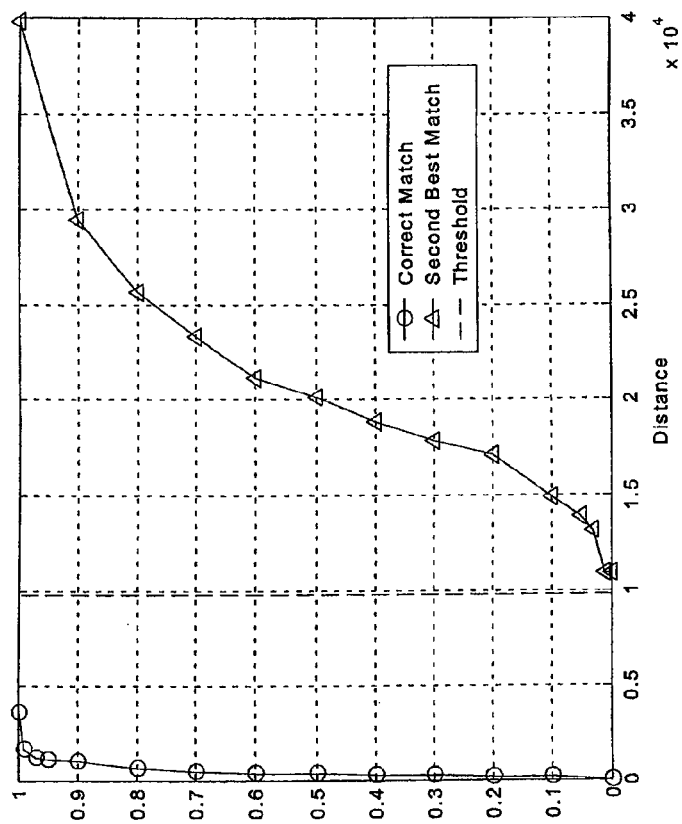
FIG. 9A
FIG. 9B
FIG. 9C
FIG. 9D

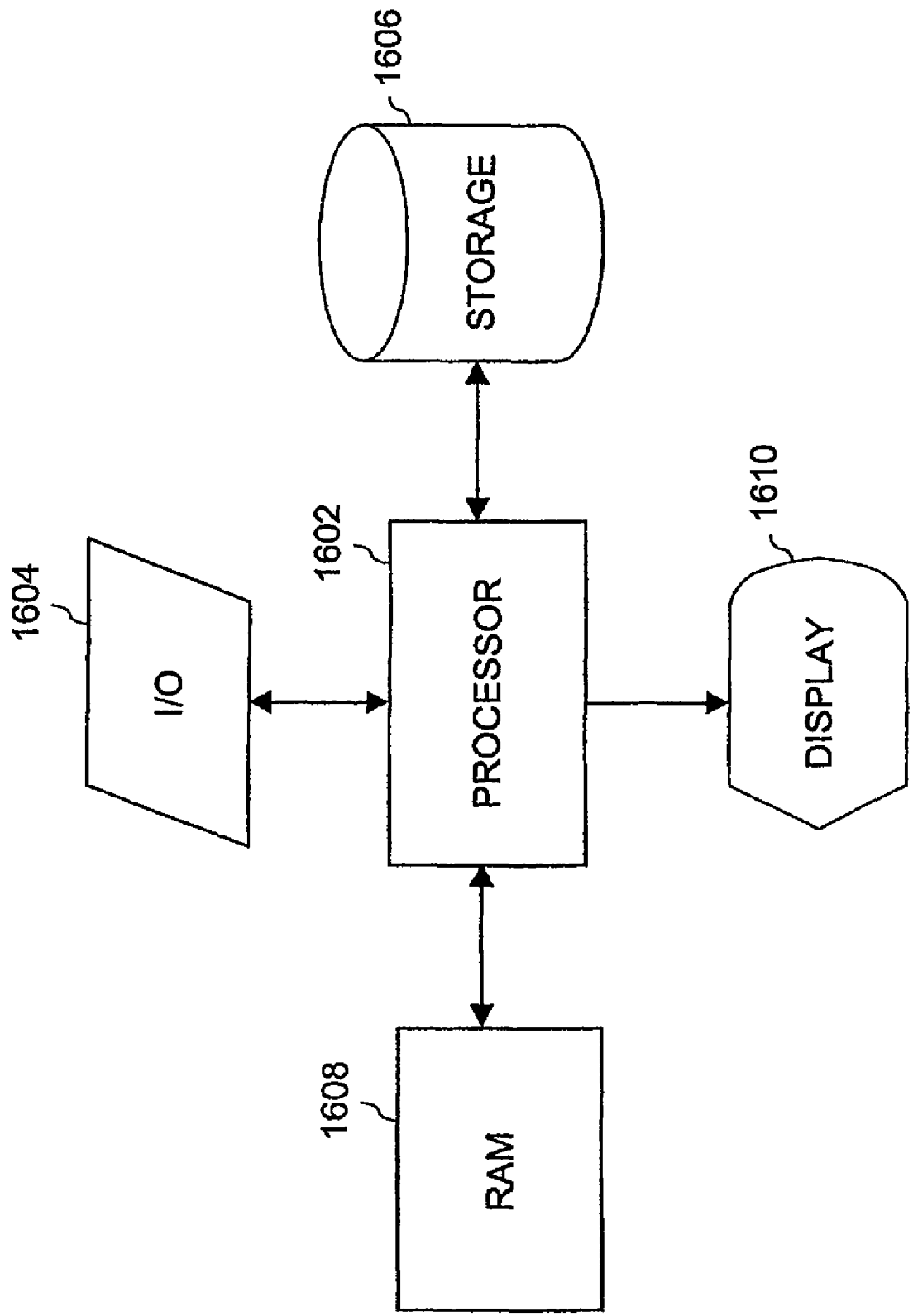

AUTOMATIC IDENTIFICATION OF SOUND RECORDINGS

CROSS-REFERENCE TO RELATED APPLICATION(S)

This application is a continuation of U.S. application Ser. No. 10/200,034 filed Jul. 22, 2002, now U.S. Pat. No. 7,328,153 entitled AUTOMATIC IDENTIFICATION OF SOUND RECORDINGS, which claims priority to U.S. provisional application No. 60/306,911, entitled, AUTOMATIC IDENTIFICATION OF SOUND RECORDINGS, filed Jul. 20, 2001, the entire content of each of the applications is incorporated herein by reference.

BACKGROUND OF THE INVENTION

1. Field of the Invention

The present invention is directed to the identification of recordings and, more particularly, to the identification of sound recordings, such as recordings of music or spoken words.

2. Description of the Related Art

Identification is a process by which a copy of a sound recording is recognized as being the same as the original or reference recording. There is a need to automatically identify sound recordings for the purposes of registration, monitoring and control, all of which are important in ensuring the financial compensation of the rights owners and creators of music. There is also a need for identification for the purposes of adding value to, or extracting value from the music. Registration is a process by which the owner of content records his or her ownership. Monitoring records the movement and use of content so that it can be reported back to the owner, generally for purposes of payment. Control is a process by which the wishes of a content owner regarding the use and movement of the content are enforced.

Some examples of adding value to music include: identification of unlabelled or mislabeled content to make it easier for users of the music to access and organize their music and identification so that the user can be provided with related content, for example, information about the artist, or recommendations of similar pieces of music.

Some examples of extracting value from music include: identification for the provision of buying opportunities and identification for the purpose of interpreting something about the psychographics of the listener. For example, a particular song may trigger an offer to purchase it, or a related song by the same artist, or an article of clothing made popular by that artist. This extracts value from the music by using it as a delivery vehicle for a commercial message. In addition, psychographics uses psychological, sociological and anthropological factors to determine how a market is segmented by the propensity of groups within the market to make a decision about a product, person, ideology or otherwise hold an attitude or use a medium. This information can be used to better focus commercial messages and opportunities. This extracts value from the music by using it to profile the listener.

There have been two types of monitoring, reflecting the delivery of stored music and the delivery of played music. Stored music is considered to be copies for which there are "mechanical" or "reproduction" rights. Played music may be considered to be a performance, whether or not the performance is live or recorded. This demarcation is reflected in different payment structures, which are administered by different organizations. One organization (Harry Fox Agency) collects reproduction royalties when CDs or tapes are sold. These physical goods are counted and monitored using a variety of accounting practices and techniques. ASCAP, BMI and SESAC collect performance royalties when live or recorded music is played on the radio or in public spaces. These performances are monitored using a combination of automatic identification methods and human verification.

There are several different methods used for delivery of music. Live music is "delivered" in a performance space, by radio and TV (both analog and digital) and over the Internet. Stored music or other sound recordings may be delivered on physical media associated with the recordings (CDs, cassettes, mini discs, CD-RWs, DVDs) which may be moved (stored, distributed, sold, etc). However, a sound recording does not have to be associated with a physical medium; it can also be easily transported in electronic form by streaming, or by moving from one storage location to another. In both cases, either radio or the Internet may be used to transport the sound recording.

Digital music and the Internet are changing the way music is delivered and used, and are changing the requirements for music identification. These changes are brought about because the Internet can be used to deliver both performances and copies, and the Internet increases the number of delivery channels.

Whereas a terrestrial radio station may reach one thousand listeners at any moment in time while playing the same one song, an Internet radio station may reach one thousand listeners at one time while playing one thousand different songs. This means that a larger and more diverse selection of songs must be identified.

Existing business models for music are being challenged. For example, CD readers attached to personal computers, and peer-to-peer services are making it easier to copy and exchange music. New methods for registering, monitoring, controlling, and extracting value from music are needed.

The copying of digital music is easy. Users are able to make copies on a variety of different media formats, for a variety of consumer electronic devices. This creates a need to identify more copies of songs, across multiple media formats and types of device. Some of the devices are not connected to the Internet, which introduces an additional requirement on an identification system.

There is a need for a single solution that can identify streamed or moved music across all delivery channels. A single solution is preferable due to economies of scale, to remove the need to reconcile across methods and databases, and to provide a simple solution for all aspects of the problem.

Current methods rely on attaching tags, watermarks, encryption, and fingerprints (the use of intrinsic features of the music). Tags are attached to the physical media or to the digital copy. The lowest common denominator is the artist-title pair (ATP). Other information can include publisher, label and date. Attempts to give a sound recoding a unique ID include the ISRC (International Standard Recording Code), the ISWC (International Standard Work Code), the EAN (European Article Number), the UPC (Universal Product Code), ISMN (International Standard Music Number) and the CAE (Compositeur, Auteur, Editeur). All are alphanumeric codes that are either attached to physical copies of the sound recording, or embedded in the digital copy. Part of the rationale for creating the various codes was to assist with the automated identification and tracking of the works.

However, there are problems with the use of ATPs and alpha-numeric codes. They can be easily detached or changed (as evidenced by the recent attempts by Napster to use ATPs to block content). Once detached or changed, they require human intervention (listening) to be reattached or corrected.

There is no way to automatically authenticate that the content is what it's tag claims it to be. They must be attached at source, prior to duplication, which reduces their utility with legacy content. They are applied intermittently or incorrectly. They require a critical mass of industry participants to be useful. EAN/UPC identify the CD and are not useful for individual music tracks. In some countries, there are laws against transmitting data along with the music, which limits their utility. Also, transmitting such data may require additional bandwidth.

Watermarks add an indelible and inaudible signal that is interpreted by a special reader. Watermarks can be robust to noise. They are good for combinations of live and recorded content, for example where an announcer speaks over recorded background music. Watermarks can deliver additional information without the need to access a database. The problems with watermarks are: they are not necessarily indelible nor inaudible; they require addition at source, prior to duplication, and therefore have limited utility for legacy content; and if applied to legacy content, there still needs to be a way to first identify the music.

Encryption uses techniques embedded in software to make the content inaccessible without a key. Identification is done prior to encryption, and the identification information (metadata) is locked up with the music. Some of the problems with encryption are: it has limited utility for legacy content, if applied to legacy content, there still needs to be a way to identify that content; and there is consumer resistance to locking up music. These problems are caused by incompatibilities between equipment that plays locked music and equipment that does not, leading to a reluctance to purchase equipment that may not play their existing music collections and to purchasing music that may not play on equipment the consumers currently own.

Another approach is to use intrinsic properties of the music to provide a "fingerprint." The identifying features are a part of the music, therefore changing them changes the music. The advantages of this method include: nothing is added to the music; the fingerprints can be regenerated at any time; fingerprints work on legacy content and do not require broad industry adoption to be applicable to all content; and fingerprints can made of an entire song, and can therefore ensure that song's completeness and authenticity.

Current fingerprinting methods are not suitable, for reasons that will be described in more detail later. Their limitations come about because of the requirements for (1) identifying large numbers of songs, and (2) identifying songs that have slight variations from the original. These variations are insufficient to cause a human to judge the songs as being different, but they can be sufficient to cause a machine to do so. In sum, the problems with current fingerprinting methods are that some systems can handle a large number of songs, but cannot handle the variations, while other systems can handle many variations, but cannot handle a large number of songs.

Variations in songs may be caused by numerous "delivery channel effects." For example, songs played on the radio are subjected to both static and dynamic frequency equalization and volume normalization. Songs may also be speeded up or slowed down to shorten or lengthen their playing time. Stored music can vary from the original because of the same effects found in radio, and because of other manipulations. The most common manipulation is the use of a codec to reduce the size of a file of stored music to make it more suitable for storage or movement. The most common codec is the MP3. The codec encodes the song to a compressed form, and at playback decodes, or expands, it for listening. An ideal codec will remove only those parts of the original that are minimally perceptually salient so that the version that has undergone compression and expansion sounds like the original. However, the process is lossy and changes the waveform of the copy from that of the original. Other manipulations and their manifestations (delivery channel effects) are described below.

Existing methods are intended for identifying stored sound recordings, and for identifying sound recordings as they are being played (performances). The main distinctions between the two identification systems are:

Played music identification systems must be capable of identifying a song without any knowledge of the song's start point. It is easier to find the start point in stored music.

Played music identification can have an upper capacity of about 10,000 reference recordings. Stored music requires a larger capacity.

Played music is identified as it is being played, so there is not a stringent requirement for speed of fingerprint extraction or lookup. For many applications, stored music must be identified at many times real time.

Played music identification may be limited to several thousand radio stations. There is a need for stored music identification by tens of millions of individual music users.

Played music must be identified in the presence of manipulations that create variations from the original. Methods of identifying stored music in the prior art are not designed to compensate for variations.

Both categories include techniques that rely on the use of intrinsic properties, the addition of metadata or the addition of inaudible signals. However the examination will concentrate on those identification techniques that use the intrinsic properties of the sound recording, either by themselves, or in combination with other information.

One commonly used technique for identifying copies of music on a compact disc (CD) is to use the spacing between tracks and the duration of tracks or the "Table of Contents" of a CD to create a unique identifier for the CD, as described in U.S. Pat. No. 6,230,192. The CD identity is used to lookup the name and order of the tracks from a previously completed database. This method does not work once the music has been removed from the CD, and is a copy on a computer hard drive.

Another technique uses a hash algorithm to label a file. Hash algorithms, such as the Secure Hash Algorithm (SHA1) or MD5, are meant for digital signature applications where a large message has to be "compressed" in a secure manner before being signed with the private key. The algorithms may be applied to a music file of arbitrary length to produce a 128-bit message digest. The benefits of the hash values are they are quick to extract, they are small in size, and they can be used to perform rapid database searches because each hash is a unique identifier for a file. The disadvantages include:

(1) The algorithms are designed to be secure to tampering, so any change to the file, however minor, will result in a different hash value. As a result, the hash value changes when the file is subjected to any of the channel effects. For example, there are on average 550 variants of each song on a large file sharing exchange such as Napster. A slight alteration of a song (e.g. the removal of one sample) will result in a different hash, which will not be able to be used to identify the song.

(2) Each variant of a song file requires that a different hash be stored in the database, resulting in a large database with a many-to-one relationship.

Yet another technique is described in U.S. Pat. No. 5,918,223. The method extracts a series of feature vectors from a piece of music which it then sends to a database for identification. The advantages of this technique are that the feature vectors consist of intrinsic properties of music that are claimed to be perceptually salient. This means that they should be robust to many of the distribution channel effects. The disadvantages are:
(1) The feature vector is computationally intensive to extract
(2) The feature vector is large, which means:
   (a) It takes long time to look up and is expensive to implement for large numbers of queries.
   (b) It increases the amount of network traffic
(3) Each individual vector does not contain sufficient information to uniquely identify a song. Identification is accomplished after a series of feature vectors are matched in the database. The database therefore takes a long time to search and must be limited in size.
(4) There is no evidence that the technique is immune to all delivery channel effects.

One method for identifying played sound recordings is described by Kenyon in U.S. Pat. No. 5,210,820. The '820 patent is primarily designed for radio station monitoring where the signal is acquired from listening stations tuned to a terrestrial radio station of interest. The system is capable of identifying songs irrespective of speed variation, noise bursts, and signal dropout. It is capable of monitoring for one of approximately 10,000 songs in each of 5 radio channels. The disclosed technique is fairly robust, but the size of the database of reference songs is limited, primarily due to the database search techniques used.

Identifying all sound recordings includes stored music for around 10 million different songs in early 2002. For streamed music this number is in the tens of thousands. The prior art has focused on streamed music with a much smaller number of songs.

Identifying legacy content applies to approximately 500 billion copies of digital music in existence. Methods that require the music to be identified at the point of origin cannot identify these copies.

New content consists of relatively few songs that comprise the majority of popular music, distributed from a few points of origin, with processes in place to control the workflow, plus a larger number of songs distributed from many points of origin. These points are geographically distributed, and have diverse methods of workflow management. Therefore, methods that require the music to be identified at the point of origin cannot identify the majority of songs.

SUMMARY OF THE INVENTION

An aspect of the invention is to automatically identify all sound recordings, including legacy content and new content.

Another aspect of the invention is to identify sound recordings rapidly. The system should be able to identify music at many times real time. For example a three minute song should be identified in less than three seconds.

A further aspect of the invention is to automatically identify sound recordings with computational efficiency of extraction and lookup. Computational efficiency of the fingerprint extraction and lookup is desirable because many of the songs will be identified on consumer electronics devices with limited processing power.

Yet another aspect of the invention is to automatically identify sound recordings using a small fingerprint extracted from each sound recording and compact lookup code. Both are desirable because many of the songs will be identified on consumer electronics devices with limited storage space.

A still further aspect of the invention is to identify sound recordings whether the tags are absent or incorrectly applied, whether intentionally or not.

Yet another aspect of this invention is to automatically identify variations of sound recordings where those variations are caused by delivery channel effects. The manifestations of those effects that should be considered include:
(1) DC value—the average value of a digitized song waveform amplitude in the time domain.
(2) Phase Inversion—the process of multiplying every time domain digital sample of a song waveform by −1. For a multichannel song, phase inversion is applied to all channels.
(3) Pitch-invariant speed increase—the process of speeding up the playback rate of a song without affecting its pitch.
(4) Peak limiting—the process of limiting the maximum signal amplitude to a specified threshold.
(5) Volume normalization—the process by which the gain of an audio file is increased until its loudest point (or sample) is at maximum level.
(6) Dynamic range reduction—the process by which the dynamic range of a sound is reduced. Dynamic Range is the ratio of the strongest, or loudest part to the weakest, or softest, part of a sound; it is measured in dB
(7) Equalization—the process used to alter the relative balance of frequencies to produce desired tonal characteristics in sounds.
(8) Remastering—the process of mastering a recording after the first mastering has been done. May happen when the "master tape" is re-processed because a recording is reissued, or included in a different album. Sometimes an actual mastering house is used, and other times the "mastered" material is sent directly to a duplication facility where they can also do the final few steps. Typical mastering effects include many potential processes of the audio signal such as equalization, compression, limiting, normalization, widening the stereo image, editing fades, and just putting the songs in the correct order
(9) Bit rates—the rate, in kbs at which an original song is compressed by a codec.
(10) Start time variations—variations in the fingerprint caused by what different players consider the start of a song.
(11) Different rippers—variations in the fingerprint caused by different rippers (software devices that extract a song from a CD for compression).
(12) Codecs—variations in the fingerprint caused by different coding and decoding schemes.
(13) Watermarking—variations in the fingerprints caused by the addition of a watermark.
(14) Addition of noise—variations in the fingerprint caused by the addition of noise to the audio, from various sources.

The requirements for being able to deal with legacy content preclude systems based on encryption, watermarking or tagging at source. The requirement to be robust to simple manipulations of the tags precludes tagging systems. This leaves fingerprinting as the only way of meeting most of the requirements.

An additional requirement for some applications is that the entire song be checked to ensure that it is all present and correct. Reasons for this requirement include: (1) quality assurance where the rights owner of a song, or an artist, may wish to assure that their song is only distributed in its entirety, and (2) prevention of spoofing which relates to attempts to misrepresent identification which may be a tactic used to distribute songs illegally over a network. If a fingerprint is taken from a small section of the song, such as near the beginning, someone trying to spoof the system might prepend a section of a legal song onto the front of an illegal song.

A further aspect of this invention is automatic identification and authentication of entire songs.

The above aspects can be attained by a method of identifying recordings by extracting at least one candidate fingerprint from at least one portion of an unidentified recording; and searching for a match between at least one value derived from the at least one candidate fingerprint and a value in at least one reference fingerprint among a plurality of reference fingerprints.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 9A-9D are graphs of the distributions of matches for wave files, blade 128 files, blade 32 files and fhg 128 kg MP3 files.

FIG. 16 is a simplified block diagram of a system for implementing the invention.

DETAILED DESCRIPTION OF THE PREFERRED EMBODIMENTS

Steps in the creation of an automatic identification system based on intrinsic properties of the music (fingerprinting) according to the present invention include: choosing features, creating a fingerprint from the features, creating a database search method, scaling up the process and optimizing the process. A process for selecting components for inclusion in fingerprints is shown in FIG. 1A and an extraction procedure in accordance with an embodiment of the present invention is illustrated in FIG. 1B.

Figure 1A:
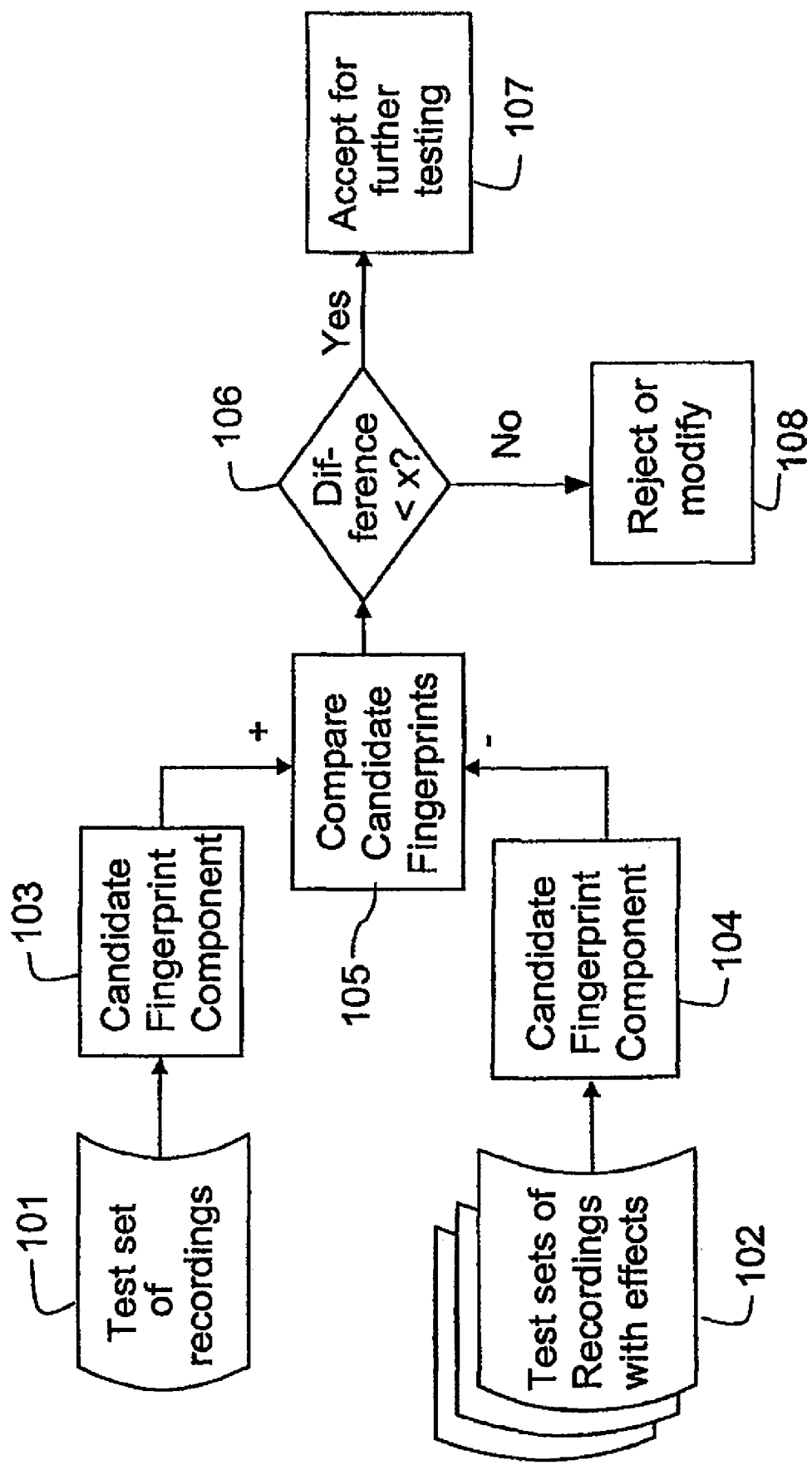
FIG. 1A is a flowchart of a fingerprint component testing procedure according to an embodiment of the invention.
Figure 1B:
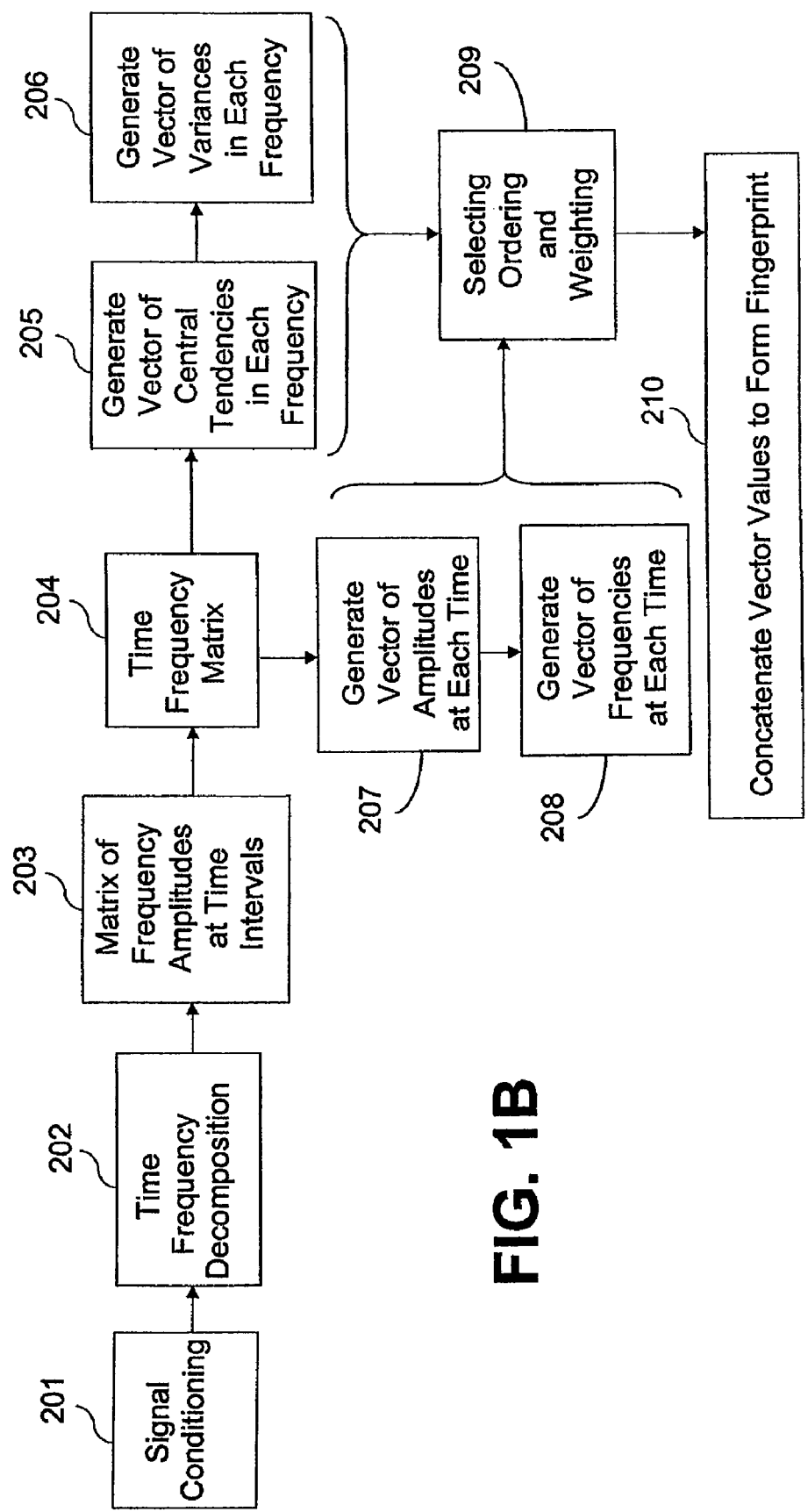
FIG. 1B is a flowchart of a procedure for fingerprint creation according to an embodiment of the present invention.

As an example of choosing features, a collection of 10,000 sound recordings was generated as test set 101 in FIG. 1A, and subjected to a variety of manipulations to create test sets with effects 102. The manipulations represented the range of effects described above. Candidate features were extracted from both the test set 103 and the test set with effects 104, and these features were compared 105. An ideal feature would demonstrate no effect of the manipulation. However, more realistically, a criteria was determined 106, below which the candidate feature was accepted and subjected to further testing 107.

Having successfully passed the test of invariance to effects, the candidate components were subjected to the additional criteria of size and extraction speed. The fingerprint is preferably extracted in less than one second, and the eventual size of the fingerprint is preferably less than 100 bytes. Components that met all three criteria were considered for use in the fingerprint. Candidate components that did not meet one or more of the criteria were eliminated.

The features were combined into a fingerprint by concatenation. Quantization of the values was attempted. This is a process in which the continuous range of values of each element is sampled and divided into non-overlapping subranges, and a discrete, unique value is assigned to each subrange. If successful, this would have simplified subsequent database lookup. However, the features were sufficiently affected by variations in the audio such that quantization reduced the accuracy of the fingerprint.

Another question to be answered was the optimum number of elements in the fingerprint. The number of unique fingerprints FP that can be created is a function of the number of elements n and the number of discrete values of each element, e, such that:

$$FP=e^n.$$

Assuming that a fingerprint could take any combination of the e values of the n elements, a fingerprint system with 3 elements with 10 levels each would have an upper limit of $10^3$ or 1000 unique fingerprints. By increasing e or n it should possible to attain increases in the number of unique values. However, increasing the number of elements comes at a cost of increasing fingerprint size. A small fingerprint size is desirable for the reasons described above. Furthermore, it was empirically determined that not all combinations of values of the elements were found in a representative sample of sound recordings. This meant that simply increasing the values of e or n would not increase the capacity of the fingerprint system. It was also empirically determined that there needed to be a minimum spacing of fingerprints in the n dimensional hyperspace represented by the vector of concatenated values.

Therefore, a part of the process of creating the fingerprint involved determining the number of elements and values that would optimally fulfill the requirements. It was determined that using 30 elements with 32,768 values each would provide an upper bound of 200 million fingerprints.

The challenge in creating a database search method is to retrieve the best match to a candidate fingerprint from a database of reference fingerprints (which may include millions of entries) in a reasonable time. Two possible methods are exact match and inexact or fuzzy match. An exact match, or hash key approach, may be an optimal method for searching large databases owing to its scalability, simplicity and lack of ambiguity (direct table look-up). However, this requires a fingerprint that is completely invariant to the effects described earlier, and the analysis showed that this was not the case.

Another approach is to create a fingerprint that has some degree, and generally a large degree, of invariance to the effects, and to use an inexact or fuzzy match. There are two requirements for implementing a practical fuzzy match system: formulating an "intelligent" strategy to reduce the search space to a manageable size and determining an objective measure of match. Given a query, trigger, or candidate fingerprint, it is necessary to determine a match in the database. The objective measure of match may be defined as a scalar value, which sets a boundary of what is and is not a match.

Some aspects of system performance were tested with a database of 10 million bogus song fingerprints. However there are some system performance issues that cannot be answered other than with a full-scale working system using the fingerprints of real songs. For this purpose, the signatures of 1 million real, unique songs, representing the world's supply of music, were collected. This enabled the conducting of tests of accuracy and performance that would have been impossible otherwise. Subsequently, the performance of the system was optimized by (a) changing the order in which elements of the fingerprint vector were searched against the database to decrease the lookup time, and (b) using a cache of fingerprints in memory, to decrease search time. The resulting method combines the robustness and flexibility of fuzzy matching with the speed of exact matching and can be applied to identification of streamed music.

Embodiments of the present invention are described below for rapidly searching a large database, for optimizing the search by adjusting various parameters, for using the system to identify recordings where the start point is unknown, and for extracting features from an entire song for purposes of identification. An embodiment of the present invention is described that combines a fuzzy search algorithm to identify content, with an exact search, to increase subsequent speed.

Digital audio files exist in various formats that result from different encoders, bit rates, and sampling frequencies. As shown in FIG. 1B, a conditioning stage 201 is preferably included to process an audio signal and reduce it to a format that is consistent for every song and is easily manipulated by the fingerprint extraction stage. Signal conditioning 201 may include: extracting a stream of data, stripping away silence, and performing transformations to increase the robustness of the fingerprint.

The preferred method accepts a variety of inputs and produces a pulse code modulated (PCM) stream of data that represents a monaural analog waveform sampled at 11,025 Hz. Leading zeroes are stripped away until there are at least three consecutive non-zero data points, the first of which is considered the start point. The extracted section consists of 156,904 contiguous samples from the start point. This forms the first 14.23 seconds of the file. The sampling rate and sample size represent a good compromise between fingerprint quality, data size and extraction time.

In another embodiment of the present invention, a different section of the PCM stream may be extracted. For example, a section that starts at the $156,905^{th}$ sample from the start point and uses the next 156,904 contiguous samples.

In yet another embodiment of the present invention, a second section of music is extracted. For example, the first 150,000 contiguous samples after the start point, and a set of 100,000 samples 30 seconds after the start point.

Figure 2:
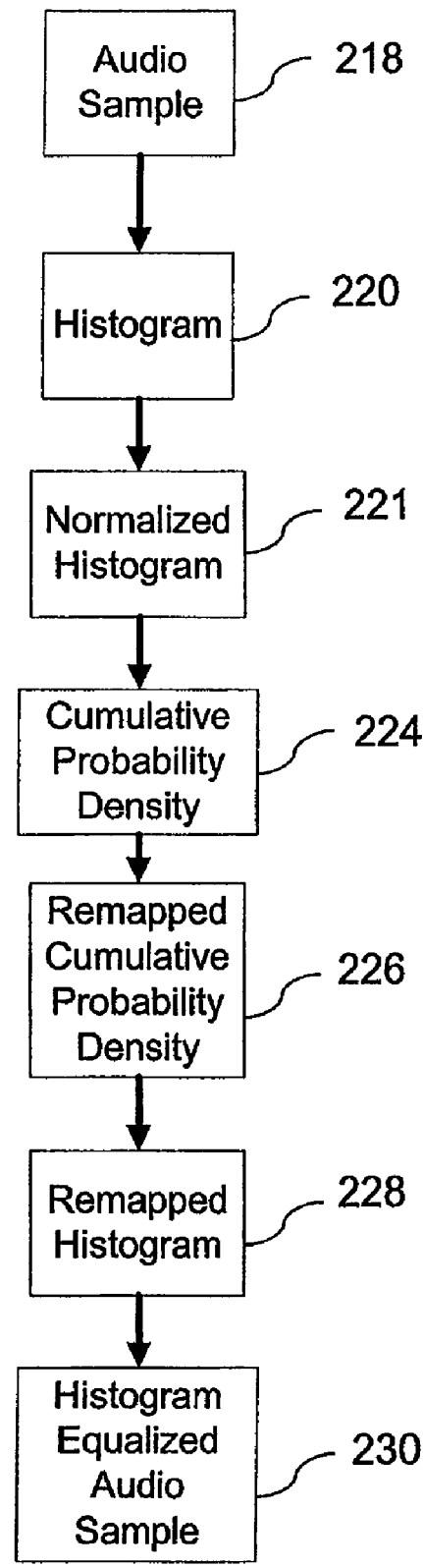
FIG. 2 is flowchart of the procedure for histogram equalization of sound files.

Signal conditioning 201 may also include transforming the PCM stream to increase the robustness of the fingerprint. The preferred method uses histogram equalization to make the fingerprint robust to the effects of limiting. Histogram equalization is a popular technique used in image processing to enhance the contrast of images. Limiting of audio is an operation that is similar to histogram equalization, in that each sample value is individually mapped to another value. The purpose of limiting is to suppress the outliers while leaving others unchanged. The procedure is illustrated in FIG. 2. The PCM stream 218 is made into a histogram 220 where individual audio samples are placed into bins defining particular ranges of amplitude. The resultant histogram represents amplitude bins on the x-axis and numbers of samples in each bin in the y-axis. This histogram is normalized, so that the sum of the values in all of the bins is equal to unity 222. Thus, each bar of the histogram represents the probability density function of the occurrences of samples at that amplitude. The probability density functions are summed 224 to create a cumulative probability density. If the histogram was flat, with equal occurrences of samples at each amplitude, the resultant cumulative probability curve would be monotonic. The samples are remapped 226 to make them as close to monotonic as possible, resulting in a reshaped histogram 228. The new values are mapped back to the PCM stream 230 which now represents histogram equalized audio. Other embodiments use different mappings at step 226 to non-monotonic shapes.

Another embodiment of the present invention takes into account that some music samples may demonstrate a very wide dynamic range across time. For example, classical music may have a quiet section before a loud section. To deal with this, a process analogous to local contrast enhancement in image processing is used. Histogram equalization is applied independently to smaller subsections of the sample. Most subsections will be self-similar. If the sample is made up of discrete sections of amplitude, most subsections will lie entirely within one or the other section. If the sample has more gradual large-scale variation, most subsections will contain only a small portion of the large-scale variation.

Figure 3:
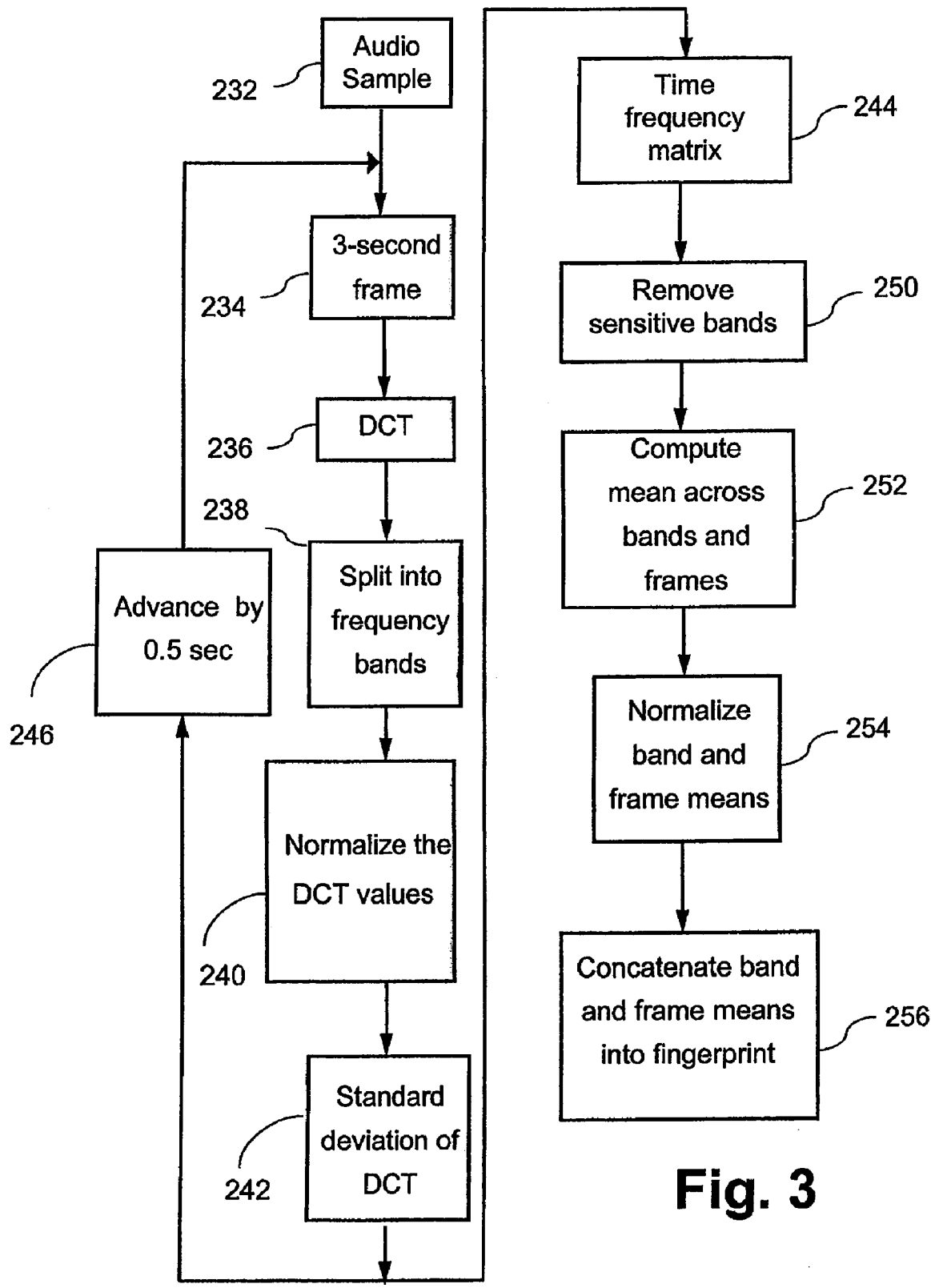
FIG. 3 is flowchart of the procedure for band-by-band frequency equalization.

Yet another embodiment of the present invention recognizes the effects of frequency equalization. Frequency equalization, or EQ, is a method to boost or attenuate the power of separate frequency bands. If the amount of EQ is large, it will alter the fingerprint because the underlying principle component of the fingerprint is the power within each frequency band. Band-by-band normalization is used to process the signal, to make the resultant fingerprint more robust to EQ, thereby making it possible to use the fingerprint to identify songs that have been subjected to frequency equalization. The preferred method is shown in FIG. 3, and is as follows:

(1) From a given 15 second sample of a PCM audio stream 232, extract a frame j 234 (approximately 3 seconds).
(2) Obtain the DCT 236 of the frame and split 238 into equal-size frequency bands. The preferred method uses 32 bands.
(3) Normalize 240 the DCT values in each band i for the frame j to L1 norm=1.

(4) Compute the standard deviation 242 of the normalized DCT values for each band I. This value corresponds to the (i,j)-th entry in the Time Frequency matrix X 244.
(5) Repeat 246 the above process using a step size of approximately 0.5 seconds.
(6) From the matrix X, remove 250 the bands that are very sensitive to slight signal variations. The preferred method removed Bands 1, and Bands 26-32.
(7) Compute 252 the mean across band vector p1 and mean across frame vector p2.
(8) Normalize 254 p1 and p2 to L1 norm=1 each.
(9) Concatenate 256 normalized p1 and p2 to form FP vector.

Another embodiment of the present invention, is as follows:
(1) Read the same portion of the audio used for fingerprint extraction.
(2) Extract the envelope in each of the frequency subbands as are used in the fingerprint. The extraction of the envelope is preferably performed by a $4^{th}$ order butterworth bandpass filter.
(3) Normalize the envelope in each subband such that the norm-1 measure of the envelope in each envelope is equal to unity.
(4) Extract the fingerprint.

In yet another embodiment of the present invention, the power in diagonal frequency regions is used. This combats the effects of both time and frequency manipulations. The method is as follows:
(1) From a given 15 second sample of a PCM stream, extract a frame j (approximately 3 s).
(2) Obtain the DCT of the frame and split in required number of equal bands (use 32 here).
(3) Normalize the DCT values in each band i for the frame j to L1 norm=1;
(4) Compute the standard deviation of the normalized DCT values for each band i. This value corresponds to the (i,j) th entry in the Time Frequency matrix X.
(5) Repeat the above process using a step size of approximately 0.5 s.
(6) From the matrix X, remove the bands that are very sensitive to slight signal variations (these were determined to be Bands 1, Bands 26-32 in this case).
(7) Obtain the means of the main diagonal and 8 off-diagonals on each side of X to give the vector p1.
(8) Repeat (g) for the matrix X rotated 90 degrees counter-clockwise to obtain the vector p2.
(9) Normalize p1 and p2 to L1 norm=1 each.
(10) Concatenate the normalized p1 and p2 to form the FP vector.

Figure 4:
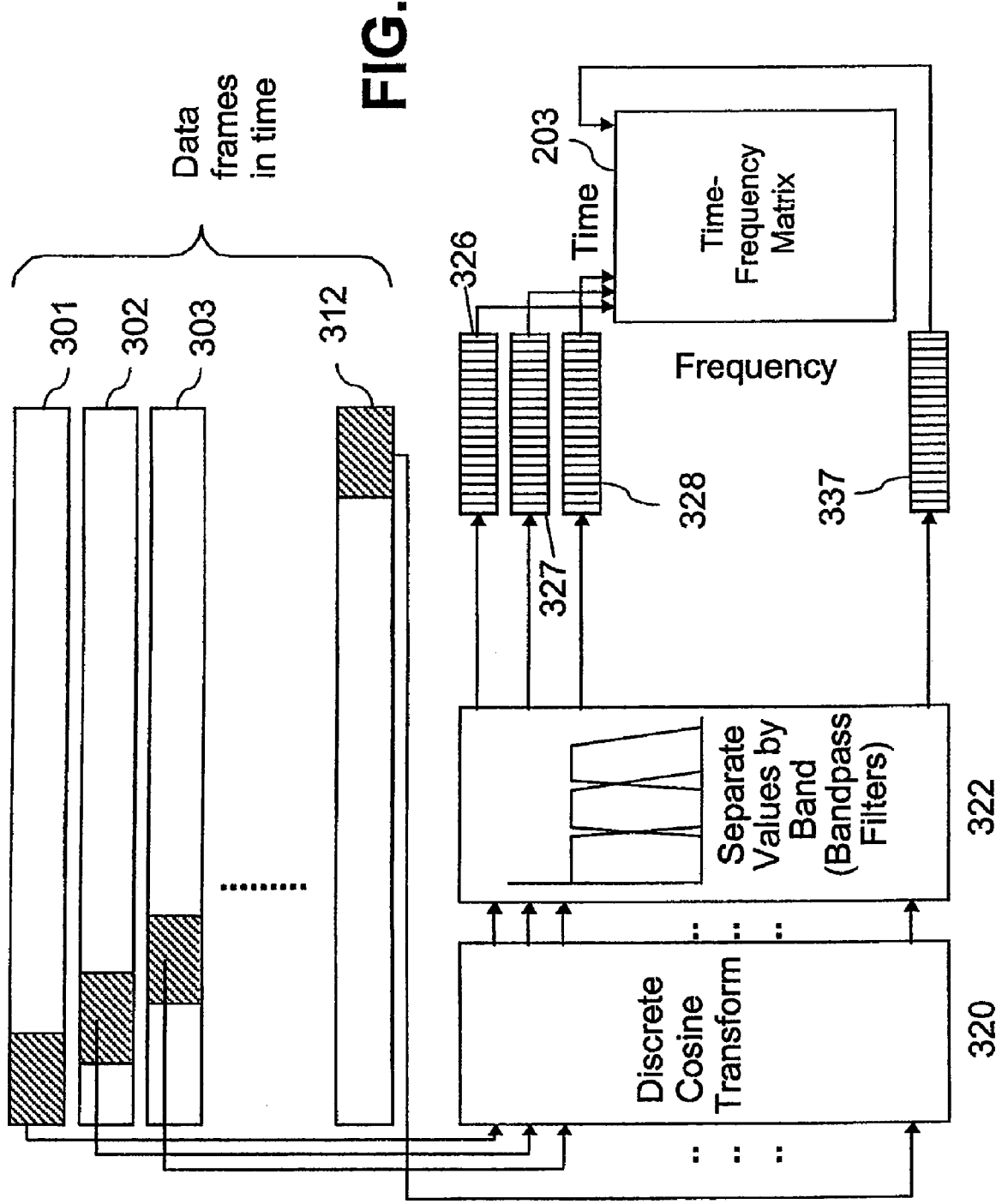
FIG. 4 is a block diagram of time-frequency decomposition to create a matrix of frequency amplitude at time intervals in FIG. 1B.

Time frequency decomposition 202 transforms the PCM signal output from signal conditioning 201 from the time domain into the frequency domain with parameters chosen to: (a) optimize sensitivity, or the ability to detect small differences between songs, (b) optimize robustness, or minimize the effects of variances caused by compression in time or frequency, and by various codecs, and (c) minimize computation time. This slices the time varying signal into durations, or frames, of some length, with some overlap between the frames and transforms each frame into the frequency domain, then divides the frequencies into bands, with some overlap across the bands An embodiment of a method of time frequency decomposition is illustrated in FIG. 4. The first frame 301 of twelve overlapping frames 301-312 of 32,768 contiguous samples (2.97 seconds) each, is collected and transformed from the time domain to the frequency domain via a discrete cosine transform (DCT) 320, producing a vector of 32,768 frequency amplitudes. The frequency resolution is 11,025/(2*32,768)=0.168 Hz/sample. A portion of the resultant frequency domain vector is bandpass filtered 322 by division into 15 frequency bands with the following band edges (in Hz): 0 to 100; 100 to 200; 200 to 300; 300 to 400; 400 to 510; 510 to 630; 630 to 770; 770 to 920; 920 to 1080; 1080 to 1270; 1270 to 1480; 1480 to 1720; 1720 to 2000; 2000 to 2320; 2320 to 2700. The vectors 326-337 of frequency amplitudes divided into bands form the columns of a matrix of frequency amplitudes at time intervals 203.

The next frame 302 of 32,768 samples is collected from the data, but shifted by 14,264 (1.29 seconds) samples over the original sequence of 156,904 samples. The DCT 320 and filtering 322 are repeated, yielding the second column 327 of the matrix 203 of frequency amplitudes at time intervals. The operation is repeated 12 times, each time shifting the beginning of the frame by 14,264 samples. The result is a matrix 203 with 15 rows of frequency bands (i) and 12 columns of time frames (j). Each element of the matrix is a collection of frequency magnitudes in a particular frequency band over a time frame. For every frame j in each frequency band i, there are $N_i$ DCT values. The number $N_i$ varies with band since bands have different bandwidths. For example, band 1, from 0 to 100 Hz contains 100/0.168=595 values, whereas band 15, from 2320 to 2700 Hz contains 380/0.168=2261 values.

The bandwidth partitions described above have a finer resolution at lower frequencies than at higher frequencies. This is because observations show that humans can use low frequency information to identify songs irrespective of manipulations. Therefore, extracting fingerprint features from the bands thus created is more likely to produce results that reflect the way a human would identify two songs as being the same.

Another embodiment of the present invention divides the entire frequency domain vector of 32,768 samples into 19 frequency bands, resulting in a time-frequency matrix with 19 rows and 12 columns. The band edges are (in Hz): 0 to 100; 100 to 200; 200 to 300; 300 to 400; 400 to 510; 510 to 630; 630 to 770; 770 to 920; 920 to 1080; 1080 to 1270; 1270 to 1480; 1480 to 1720; 1720 to 2000; 2000 to 2320; 2320 to 2700; 2700 to 3150; 3150 to 3700; 3700 to 4400; 4400 to 5300.

Yet another embodiment of the present invention divides the frequency domain vector of 32,768 samples into third-octave frequency bands, resulting in a time-frequency matrix with 27 rows and 12 columns. Alternatively a first frame of 30,000 samples can be used, followed by frames of 30,000 samples without any overlap. Yet another embodiment of the present invention uses frames of 1 second duration, overlapped by 50%. In another embodiment of the present invention the frames are transformed into the frequency domain with 10% overlap or using windowing to merge the edges of the bands together.

In any embodiment that produces matrix 203 of frequency amplitudes in each time frame, matrix 203 is transformed into a time frequency matrix 204 with some normalization and/or scaling to optimize sensitivity and robustness. In the preferred method, the frequency amplitudes at a particular time interval are elevated to the second power and added together. This operation results in a vector of 15 sums of squared frequency amplitudes, which represent the power of the signal in each band for a particular time slice of the signal.

In the preferred embodiment, the rows of time frequency matrix 204 are calculated with different numbers of values. Therefore, the 15 point vector is normalized by dividing by the number of DCT values ($N_i$) in each row. For example, the band 0 to 100 Hz is divided by 595, whereas the band 2320 to 2700 is divided by 2261.

Another embodiment of the present invention uses a further normalization step, to minimize the effects of any frequency equalization that a file may have been subjected to, and the effects of variations in volume between the candidate and registration songs. This normalization is done as follows, given the time-frequency matrix $M=[M_{i,j}]$, where $M_{i,j}$ is the RMS power value of the i-th band at the j-the frame, $i=1$ to 15 is the band index, and $j=1$ to 12 is the frame index, a frequency normalization scheme is introduced, as follows, each row vector $\vec{M}_i = [M_{i,1}\ M_{i,2}\ \ldots\ M_{i,12}]$, $i=1$ to 15, holds the twelve RMS power values of the i-th band.

The entire vector is scaled using the following formula:

$$\vec{M}_i \leftarrow \frac{\vec{M}_i}{\|\vec{M}_i\|_p} \quad p = 1, 2, \ldots, \infty$$

Time frequency matrix 204 is essentially a spectrogram. The next step reduces the spectrogram to the least number of values which best represent it. There are numerous methods for doing so, including time and frequency marginals, principal component analysis, singular value decomposition, and moments of the spectrogram in time and frequency.

The preferred method uses two marginal values: vector 205 of central tendency in each frequency band known as the power band (PB) and vector 206 of variances in each frequency band known as the standard deviation power window (STD PW). To compute PB for frame j in band i with $N_i$ DCT entries $x_k$, $PB(i)=\text{sqrt}[(\text{sum}_j \text{abs}(x_k))/12)]$, where j is the frame index.

The STD PW for a band is the standard deviation across frames of the root mean square values of the DCT for that band. The STD PW may be rescaled by the number of DCT values in each frame.

Another embodiment of the present invention uses the vector 208 of frequencies at each time known as the frequency centroid vector (FCV). To compute the FCV, all nineteen bands, instead of only fifteen bands, are preferably used. Each column vector $\vec{M}_j = [M_{1,j}\ M_{2,j}\ \ldots\ M_{19,j}]^T$ holds the nineteen RMS power values of each band in the j-th time frame. The nineteen bands are subdivided into a low-band group of band #1 to band #10, and a high-band group of band #11 to band #19. Two centroids are generated, the centroid of the low-band group and the centroid of the high-band group. The centroids improve the fingerprint recognition system's ability to track songs whose start points may not be available, e.g. streaming audio, or a random segment of a song:

In yet another embodiment of the present invention, principal component analysis is used. In this method the most representative component is extracted from time-frequency matrix 204. Mathematically, suppose X represents time frequency matrix 204. By the theory of principal component analysis, X can be written as $X = \Sigma_i \sigma_i x_i$, where $i=1, 2, \ldots$ The components $x_i$ are the building blocks of the matrix X and the values $\sigma_i$ are the weights (importance) of each block. The principal component is that matrix $x_j$ such that $\sigma_j \geq \sigma_i$ for all i. The approach thus seeks to represent time frequency matrix 204 using the minimal set of components that captures the most important characteristics of the matrix. The advantage is that the principal component is a good trade-off between discrimination and robustness.

In yet another embodiment of the present invention, use is made of singular value decomposition (SVD) which is a specific instance of applying principal component analysis. It is widely used and results in a much-reduced feature set. The main idea here is that the building block matrices are all of rank one, essentially outer product of two vectors, one in time (u) and the other in frequency (v). If $x_j = uv^T$ is the principal component as obtained by SVD, then $\text{norm}\_2(X-x_j)$ is minimized. The advantage of using the SVD approach in audio fingerprinting is that it isolates effects applied in the time domain (shifts, peak limiting, etc.) and frequency domain (equalization) and facilitates the handling of all these effects to create a unique FP.

In yet another embodiment of the present invention, frequency based weighting of the different band values may be used instead of using the band numbers from 1 to 19. The centroid of a group of numbers may not depend on the order in which the numbers are presented. Each band may be represented, for example, with its central frequency or its bandwidth, or another set of parameters unique to that band.

In using the centroid described earlier, instead of using band numbers 1-19, the central frequency of the band or its bandwidth or some quantity representative of the band may be used. Using a serial number to depict a band may lead to problems if the band orders get mixed up, for instance. A centroid may be defined as $C=(\text{sum}_i x_i f(x_i))/\text{sum}_i x_i)$. The numbers 1-19 may be used for $x_i$ and the PB values for $f(x_i)$. This may be modified to using the central frequency of band I for $x_i$.

In yet another embodiment of the present invention, values of amplitude variance across frequencies are calculated, e.g., vector 207 of variances across frequency bands known as the standard deviation frequency (STD F). The STD F value for frame j is the standard deviation across frequencies of the root mean square values of the DCT for that frequency band.

In yet another embodiment of the present invention, a perceptual model of human hearing is created. The rationale behind a perceptual model is the simulation of human auditory performance. It has been observed that irrespective of manipulations of auditory signals in both the time and frequency domains, humans can identify a song as matching the original. While a fingerprint system can efficiently deal with each individual effect, it becomes considerably more difficult to deal with the combined effects since the signal is now a very distorted version of the original. The challenge in being robust to the varied effects is that these effects are localized in time and frequency in a manner not known to the identification system. Thus, any global operation applied to the signal to mitigate any one effect has unforeseeable consequences on the fingerprint. The goal is use a simple and approximate model of the human ear to extract features from the signal that are robust to these effects. This model is called the perceptual model.

Figure 5:
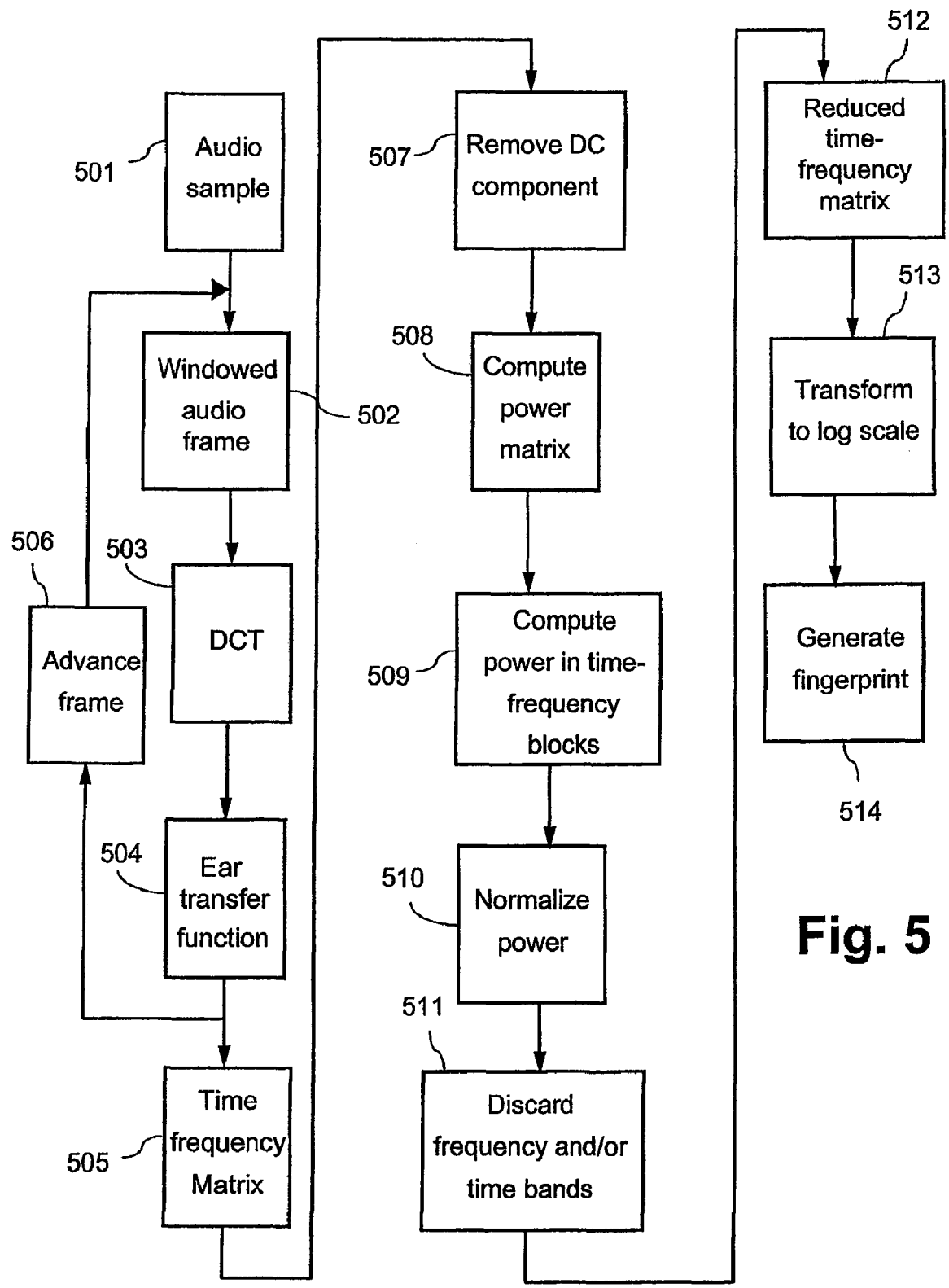
FIG. 5 is flowchart of the procedure for creating a fingerprint based on a perceptual model of audition.

The present invention includes an algorithm that uses a certain finite sample of the input sample. The preferred length is a 15 second sample of the input signal. The steps involved are illustrated in FIG. 5 and explained below.

(a) A 15 second audio sample 501 is windowed 502 into audio frames. The purpose is to use a window to provide a smooth transition between frames. Any window with smoothing properties can be used. The length of the window is application dependent. For this application, the Hamming window h and a 0.1 second frame duration may be used. The window and frame duration were determined experimentally as the combination that provided the best trade-off between time and frequency resolution and complexity. For a frame of length N, extract the signal frame and multiply it point by point with the window defined by $$h(n) + 0.54 - 0.46\cos\frac{2\pi(n-1)}{(N-1)}, \ 1 \le n \le N$$

(b) Frequency weighting: Take the DCT of the windowed signal 503 and apply the ear model transfer function A 504 to the frequency spectra (point by point multiplication). This essentially enhances the frequencies f in the critical hearing range (2000-4000 Hz) to better model the way humans perceive sound. The idea here is that if the two signals sound the same despite the application of effects to one of them, then their frequency spectra are most likely close to each other in the human critical hearing range. Hence, the enhancement of the frequency spectra values in this range.

$$A(f) = 10^{\left[\frac{1}{20}\left(-6.5e^{-\left(\frac{0.6f}{1000}3.3\right)^2} + \frac{1}{1000}\left(\frac{f}{1000}\right)^4\right)\right]}$$

(c) Perceptual time-frequency power matrix computation:
  Store the DCT values in the time frequency matrix X 505.
  Repeat 506 (a) and (b) by moving forward, using a frame overlap of 50% (0.05 s in this case).
  Discard 507 the DC component of X (to be invariant to mean signal magnitude) and compute 508 the instantaneous power (magnitude squared of DCT values) to obtain the power matrix.
  From the power matrix, compute 509 the total power in small time-frequency blocks. For example, use the 19 bark bands for the frequency with cut-off frequencies [0; 100; 200; 300; 400; 510; 630; 770; 920; 1080; 1270; 1480; 1720; 2000; 2320; 2700; 3150; 3700; 4400; 5300], and 15 equal sized bands for time, to produce a 19 by 15 power matrix. Alternatively, 19 equal sized bands could be used to generate a 19 by 19 power matrix. Note that this is not the same as using a one second non-overlapping frame.
  Normalize 510 the time-frequency matrix using the L1 norm.
  Retain 511 only the bark bands 3-17 and all 15 time bands for the 19 by 15 matrix. Alternatively, for a 15 by 15 matrix, retain 511 only the bark bands 3-17 and the time bands 3-17. The bark bands 3-17 span the perceptual human hearing range. Using the 3-17 time bands discards the time information in the beginning and end of the time sample that helps to minimize distortion. This produces a reduced time-frequency matrix Xf 512. The preferred method uses a 15 by 15 matrix.
(d) Human loudness modeling, by transforming 513 the power matrix Xf to a log scale (to base 10) and multiply by 10, i.e., $10 \log_{10}(Xf)$) to better model perceptual loudness. (It is for this reason that the values in the power matrix are normalized. This results in a bound over the range of values in the log domain).
(e) Generate 514 fingerprint by computing one or more vector values from the matrix Xf.

In a yet further embodiment of the present invention, the power in time-frequency bands are used to make the system robust to combinations of manipulations in the time and frequency domains. It is common to use the time spectrum or the frequency spectrum or a combination of the two spectra to characterize sound. However, the use of power in joint time-frequency bands is not very common. The motivation behind using the joint time-frequency power is that, in order to be robust to the various effects in both time and frequency such as volume normalization and frequency equalization among others, it would help to compute power across regions spanning a range of times and frequencies. The challenge in being robust to the varied effects is that these effects are localized in time and frequency in a manner not known to us. Thus, any global operation applied to the signal to mitigate any one effect has unforeseeable consequences on the fingerprint. However, it is reasonable to expect that by averaging across a range of times and frequencies simultaneously, anything affecting a particular time frame (as can happen in volume normalization) or frequency band (as can happen in frequency equalization) will be somewhat mitigated and better performance over a wider range of effects will be obtained.

Starting with a time-frequency power matrix Xf, the following operations on the matrix are performed:
  (a) Normalize the power matrix to L1 norm=1.
  (b) Transform the normalized power matrix Xf to a log scale (to base 10) and multiply by 10, i.e., $10 \log_{10}(Xf)$). (It is for this reason that the values in the power matrix are normalized. This produces a bound over the range of values in the log domain).
  (c) Obtain joint time-frequency power:
    Obtain half of the mean power (this is the equivalent of the rms power in the log domain) in diagonal time-frequency regions (main and 7 off-diagonals on either side of the main diagonal of Xf). This results in a 15 point power vector m1 where each power values spans a range of time and frequency bands.
    Repeat the above for Xf rotated 90 degrees counter clockwise. This results in another 15 point power vector m2. This operation places greater emphasis on the central time and frequency regions since they occur in both m1 and m2.
  (d) Obtain the fingerprint by normalizing each of the vectors m1 and m2 to L1 norm=1, concatenating normalized m1 and m2 to obtain the vector m and taking the antilog ($10^m$) to produce a 30 point fingerprint (FP).

This fingerprint works best when combined with the L1 distance norm. Use of the Itakura distance (described below) is difficult to justify in this case since the model already uses the concept of the geometric mean (arithmetic mean in the log domain is equivalent to the geometric mean in the time-frequency domain).

In a yet further embodiment of the present invention, features are extracted using wavelet-based analysis. Wavelets are used to extract orthogonal components from a song, with each component belonging in a frequency band that is perceptually relevant. The splitting is based on a wavelet-based filter bank. The feature vector values (fingerprint) are the percentage power of each of these components. The benefits of using wavelets are: (1) wavelet analysis naturally adapts the filter window according to the signal frequency to provide a clearer picture of signal components, especially the significant ones; and (2) computation of the wavelet transform is extremely efficient.

Two algorithms for a wavelet-based fingerprint will be described. The objective of both was to obtain the 10 level dyadic discrete wavelet transform of a signal, and reconstruct each level independently to obtain 10 orthogonal components in time (sum of these 10 components resulting in the original signal). Then the total power in each component (sum of magnitude squared of the sample values in each component) is computed and normalized by the total power across all 10 components to obtain percent power values. This process involves the use of the forward and inverse dyadic wavelet transforms. A much faster method is to compute the power of each of the 10 components directly from the wavelet coefficient magnitude values normalized by their scale (scalogram values). The justification of using this approach is that since the transform is orthogonal and unitary, power is preserved when going from the time to the wavelet domain and the scalogram is the measure of the power in the wavelet domain. This is the method which is presented below.

(1) Pick a suitable wavelet filter, h (low-pass) and g (high-pass).
(2) For a given song sample, determine the discrete orthogonal dyadic wavelet transform for a set of dyadic scales S.
(3) For every scale in S, compute the root mean square (rms) value of the wavelet coefficients at that scale. Normalize this value by the scale to give the scalogram value (divide the rms value by $2^J$ at scale J).
(4) Normalize the scalogram vector such that the L2 norm (square root of the sum of square of absolute values) equals 1. The final result is the WavBandPower IOA.

Figure 6A:
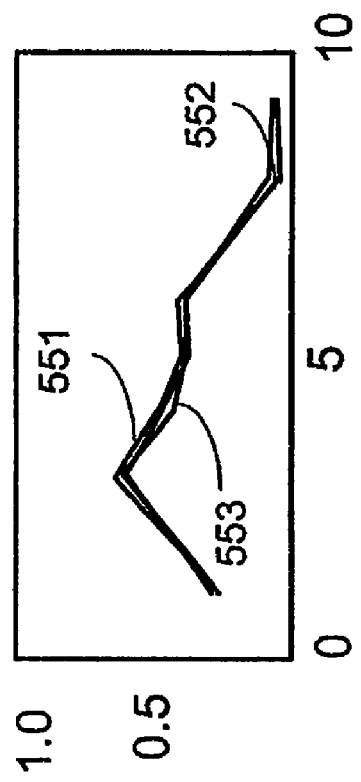
FIGS. 6A-6C are wavelet based fingerprints of three songs with three variants each.
Figure 6B:
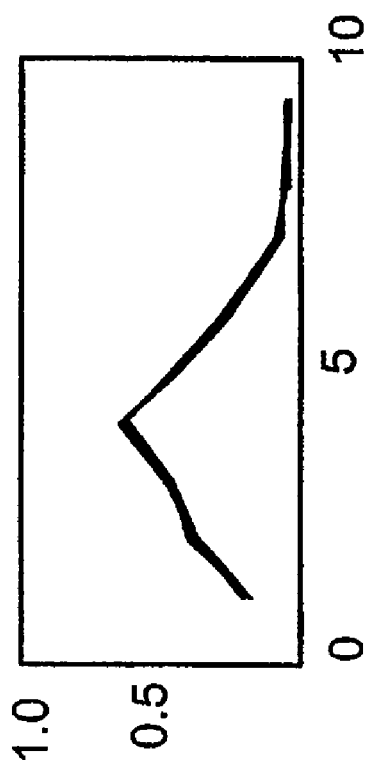
Figure 6C:
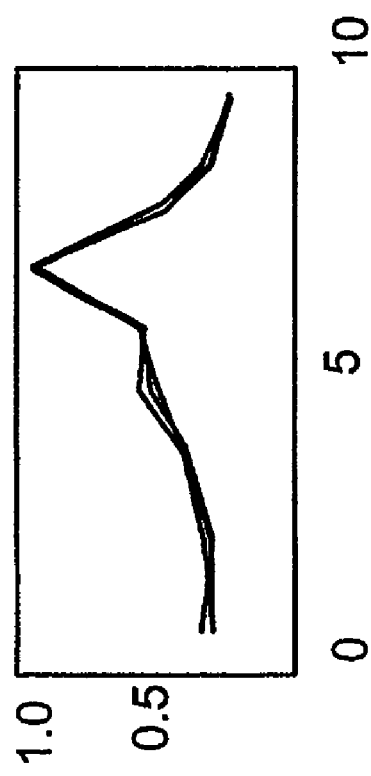

The results on three variants of three songs is shown in FIGS. 6A-6C. The close overlap of the values 351-353, from the variants of each song, and the relative difference of the vectors between songs, each of which is illustrated in one of FIGS. 6A-6C, indicate the suitability of this method as a fingerprinting technique.

The values of the representative vectors 205-208 are ordered and weighted 209 to minimize the search times and error rates of the eventual fingerprint. In the preferred method the features are ordered in decreasing order of discriminating capability between different songs. The logic is that the first M features out of a total of N features will give error rates not much greater than those found using all N features, but with much smaller search times. This way, the addition of extra features gets the system closer to zero error rates, but at the expense of more extraction and search times. This allows for the flexibility of choosing the optimal trade-off between feature set size and error performance.

To determine the order for every entry in the fingerprint, compute the total error (Type 1+Type 2) assuming the fingerprint contained only that entry. Note that in this embodiment, the fingerprint is a 30 point vector with the first 15 points being the PowerBand values for 15 different frequency bands, and the second 15 points being the StdPowerWindow values for the same bands. In other words, the preferred method of weighting gives a weight of 1 to both 205 and 206, and 0 to 207 and 208. The values in the fingerprint are paired by putting together in a tuple (pair) all values corresponding to a particular frequency band, resulting in 15 tuples. The efficacy of each tuple (frequency band) was then determined. The order of the bands in terms of decreasing efficacy was: [1, 2, 3, 4, 5, 6, 7, 9, 13, 8, 15, 12, 11, 10, 14]. This translates to the following order of entries in the fingerprint: (1,16), (2,17), (3,18), (4,19), (5,20), (6,21), (7,22), (9,24), (13,28), (8,23), (15,30), (12,27), (11,26), (10,25), (14,29). Since the first six entries are in numerical order, satisfactory performance may be obtained by leaving the entries in numerical order and concatenating the weighted values to create the final fingerprint.

In the preferred embodiment, vectors 205, 206 obtained by processing the time-frequency matrix are rescaled in such a way that each individual element is an integer in the range 0 to 32,768. If E is used to represent the vector of average power 205, P to represent the vector of standard deviations of RMS powers 206, and $e_i$ and $p_i$ the corresponding elements, then the rescaling equation is:

$$e_i = \left\lfloor \frac{e_i}{\sum e_i} \times 32768 \right\rfloor$$

$$p_i = \left\lfloor \frac{p_i}{\sum p_i} \times 32768 \right\rfloor$$

Finally, the two vectors are concatenated, putting E first and P last, resulting in vector 210 with 30 elements which is used as the fingerprint.

In another embodiment of the present invention, two fingerprints are used. The rationale is that more information leads to better identification performance. However, to maintain acceptable search speeds, there is a limit on the information that can be put into one reference fingerprint. Using two reference fingerprints in parallel, where each fingerprint contains information not found in the other (in other words, the mutual information is minimal), provides a way to obtain the advantages of using more information without sacrificing look-up speed.

There are two fundamentally different approaches for creating two reference fingerprints that fit into the parallel processing framework. Both approaches aim to return the correct result most of the time, but in different ways.

(a) Using the two fingerprints together to reduce the likelihood of a mismatch. This implies that the first part of the candidate fingerprint should match with the first part of a given reference fingerprint and the second part of the candidate fingerprint should match with the second part of the same reference fingerprint for a match to be recorded. Thus, the second portion of the fingerprint is used as a supplement to the first and serves to reinforce the decision obtained from the first. To this extent, the second portion of the fingerprint does not necessarily have to contain information orthogonal to that found in the first. An example is the use of two different attributes such as the mean and the standard deviation of the power in different frequency bands as the two parts of the fingerprint. Another example is the use of the mean and the centroid of the power in different frequency bands as the two parts of the fingerprint.

(b) Using two fingerprints separately to reduce the likelihood of not finding a song that exists in the database. This implies that either only the first part of the candidate fingerprint should match with the first part of a given reference fingerprint or only the second part of the candidate fingerprint should match with the second part of a reference fingerprint or both parts of the candidate fingerprint should match with the same reference fingerprint (as in (a) above) for a match to be recorded. If the first part of the candidate fingerprint matches with the first part of a given reference fingerprint and the second part of the candidate fingerprint matches with the second part of a different reference fingerprint, then either the reference fingerprint which registers the closest distance as the recorded match can be selected, or no match for the given candidate can be recorded. Thus, the second portion of the fingerprint is used as a complement to the first. Owing to the nature of this set-up, it is very important that the two parts of the fingerprint contain information that is orthogonal to each other.

An example is the use of the time marginal and the frequency marginal as the two parts of the fingerprint. Each part captures information in a completely different plane. Another example is the use of principal component analysis of the time-frequency matrix to extract the principal components in time and in frequency to form the two parts of the fingerprint. A practical way to do the latter would be through the use of the Singular Value Decomposition (SVD) which directly yields the principal time and frequency vectors. The rationale behind the use of time and frequency vectors in the parallel search set-up is to isolate the effects of signal manipulation in time (such as volume normalization) and that in frequency (equalization) in the time vector and the frequency vector respectively. This effectively minimizes the effect of these two primary signal manipulations, which leads to a higher identification probability.

The major steps in performing a search in a large database are partitioning the space and determining an objective measure of match based on a metric of distance. Because it is impractical to compute the distance between a candidate and every fingerprint in a large database it is necessary to determine a subset of the entire space, which contains the correct match, and compute the distance only on this reduced set. In a broad sense, the entire space is partitioned into non-overlapping regions, isolating the target song (correct match) in a small set from which the best match using a distance metric can be determined.

The preferred method is Search by Range Reduction (SRR). It works on the principle of an N-level pyramid structuring of the search space, where N is the size of the fingerprint (number of values in the fingerprint). The base of the pyramid (Level 0) contains all fingerprints in the database, and the top (Level N) is the matching fingerprint. The layers in between correspond to the partial fingerprint. Specifically, Level J of the pyramid consists of all fingerprints in the database whose first J entries are each within some predefined distance of the first J entries of the query fingerprint. There is thus a successive reduction in the number of fingerprints in the search space moving from the bottom to the top of the pyramid. Note that at the top, the distance measure between the query fingerprint and the fingerprints in Level N is used to determine the final result. If the difference measure of the best match (smallest difference measure) is less than a certain cut-off threshold, the best match is determined to be a valid one.

For certain fingerprints, the pyramid is short, leading to a fast convergence to the solution; while for others, it may be taller with more intermediate values, leading to longer search times. A pyramid with a "flat top" is one in which there are too many returns to give an efficient search using a distance comparison, such as one using the L1 distance described below. The main sources of error are sub optimal definition of rules for building the pyramid, incorrect determination of the final L1 match cut-off threshold, and/or corrupt data. Errors can be false positives, in which the candidate fingerprint is matched with the incorrect target, and false negatives, in which the candidate is never matched with an available correct target.

The search algorithm used in the preferred embodiment of the present invention is as follows:

(1) Using a representative sample of fingerprint data, compute the optimal cut-off threshold $\Delta$ for the distance measure.
(2) Using the same sample, compute the vector of thresholds [T1 T2 ... TN] for each value in the fingerprint for the SRR.
(3) Determine the acceptable size M of the final set for which the distance to determine the best match can be computed.

Figure 7A:
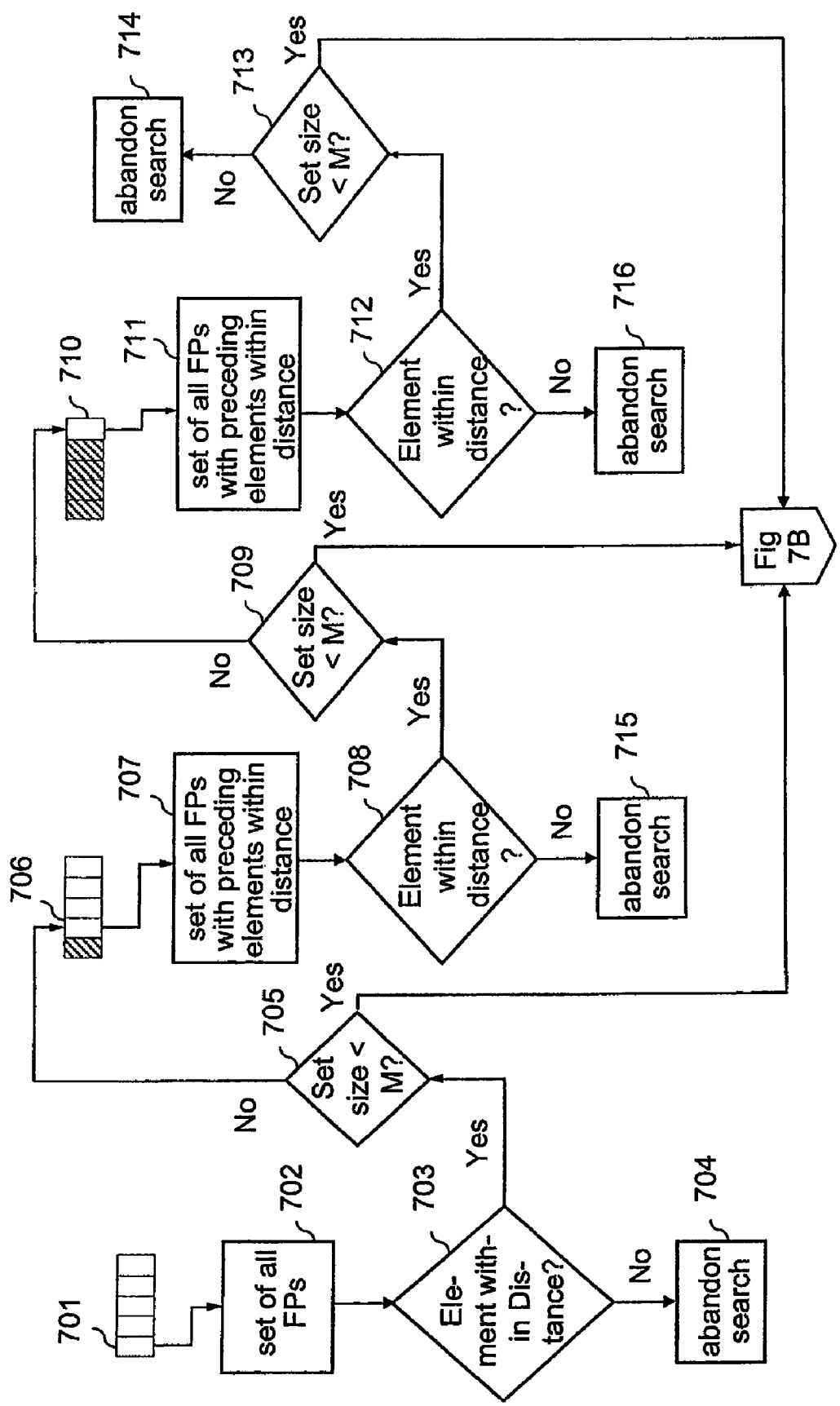
FIGS. 7A and 7B is flowchart of a procedure for searching a database of reference fingerprints.
Figure 7B:
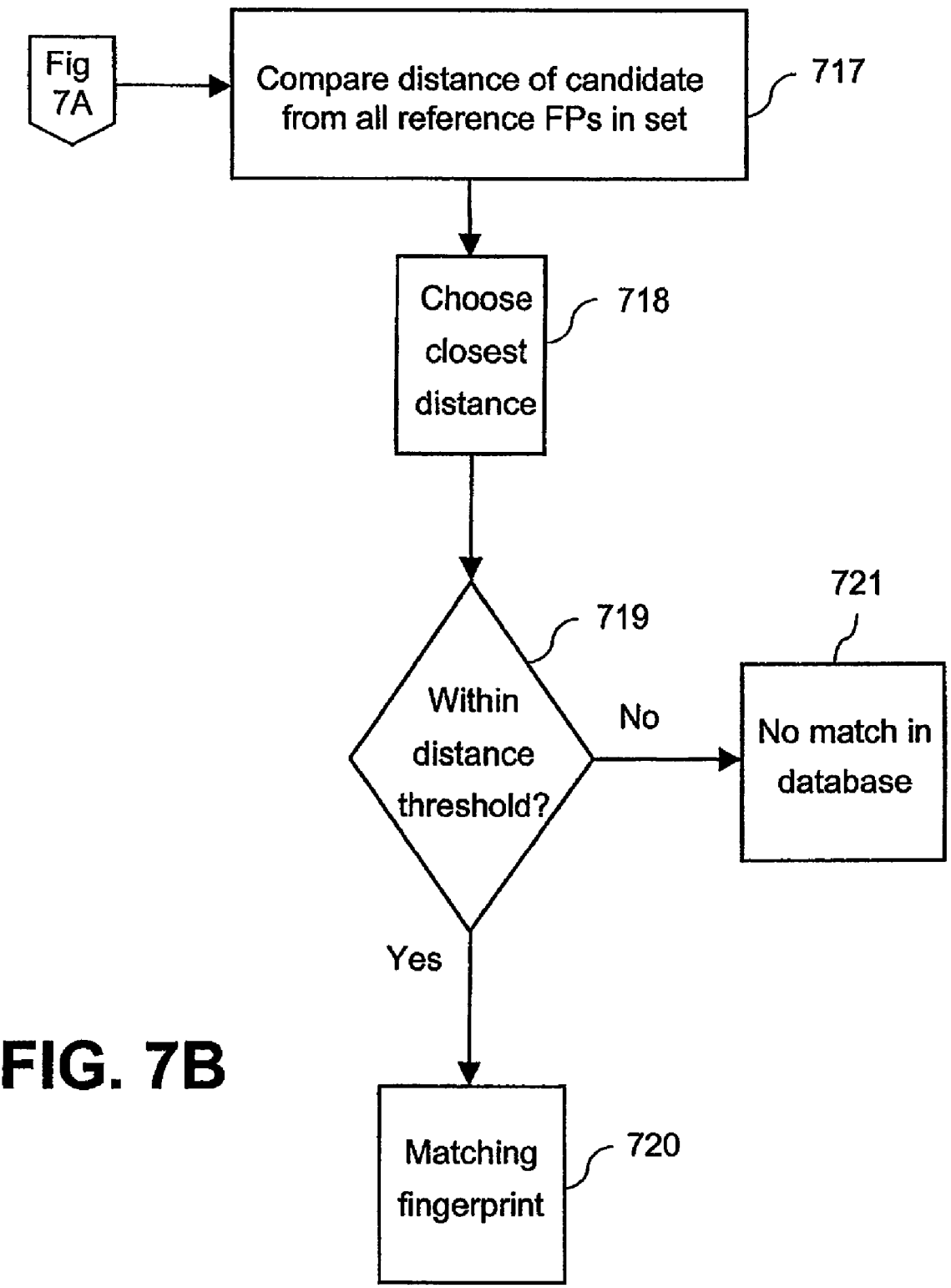

The flowchart of the algorithm is shown in FIGS. 7A and 7B. The first element 701 of a candidate fingerprint is searched against the first element of the set 702 of all reference fingerprints. The search looks for a reference element or elements within a distance 703 of the candidate element. This distance corresponds with the vector thresholds $[T_1 T_2 \ldots T_N]$ described above. If no match or matches are found the search is abandoned 704. If a match or matches are found, the number of matches is determined 705. If the number of matches is above some predetermined number, referred to as M above, the second element 706 of the candidate fingerprint is compared against the second element of the set 707 of reference fingerprints which matched on the first element. If a match or matches are found 708, the number of matches is determined 709. The element-by-element search is continued to the last candidate element 710 which is searched against the last element in the set 711 of the reference fingerprints that matched on all of the preceding elements. If the last candidate element 710 matches 712 with one or more of the last reference elements 711, but the number of matches is bigger 713 than some set size, the search is abandoned 714. If any of the preceding elements do not match any reference elements, the search is abandoned 715, 716.

If a particular candidate element matches, and the number of those matches are below some number, M, the distances of each of those reference fingerprints from the candidate fingerprint are determined 717. The closest of those matches is determined 718 and compared 719 against a predetermined threshold. If that match is below the threshold, the corresponding fingerprint is determined to be the matching fingerprint 720. If the match is above the threshold, the candidate fingerprint is declared as not in the database 721.

More specifically, the algorithm is:
(1) Given a query fingerprint $X=[x_1 \ x_2 \ \ldots \ x_N]$, determine the set of fingerprints $S_1$ whose first value is within distance $T_1$ of $x_1$; i.e., $S_1 = \{Y \in S_0, |y_1 - x_1| < T_1\}$, where $S_0$ is the entire database of fingerprints, $Y=[y_1 \ y_2 \ \ldots \ y_N]$ is a fingerprint vector belonging to S_0 and $|y_1 - x_1|$ is the absolute difference between the values $y_1$ and $x_1$.
(2) This procedure is iterated at most N times. In iteration j, determine the set: $S_j = \{Y \in S_{(J-1)}, |y_j - x_j| < T_j\}$
(3) If size $(S_j)$<M, exit.
(4) Let $\Phi$ denote the set of elements at the conclusion of the SRR.
(5) If $\Phi$ is empty, no match is returned.
(6) If $\Phi$ is non-empty, for every element in $\Phi$, compute the distance from X. Let Z be the closest match.
(7) If the distance between Z and X is less than $\Delta$, then Z is returned as the match, else no match is returned.

Note that a match is returned only if an entry in the database is found within the distance cut-off threshold. In every other case, no match is returned.

Figure 8A:
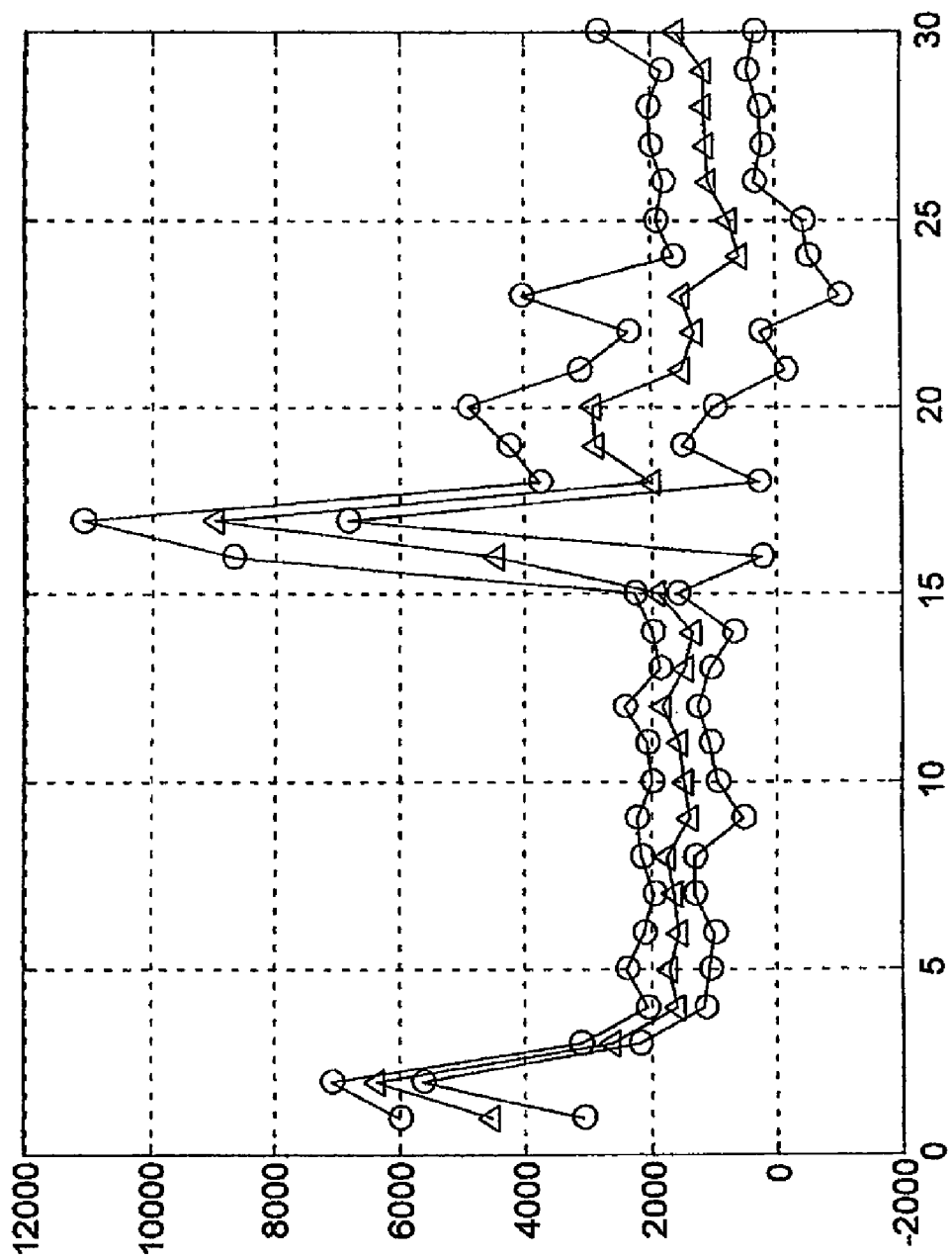
FIGS. 8A and 8B are graphs of SRR search parameters overlaid on an example of a fingerprint.
Figure 8B:
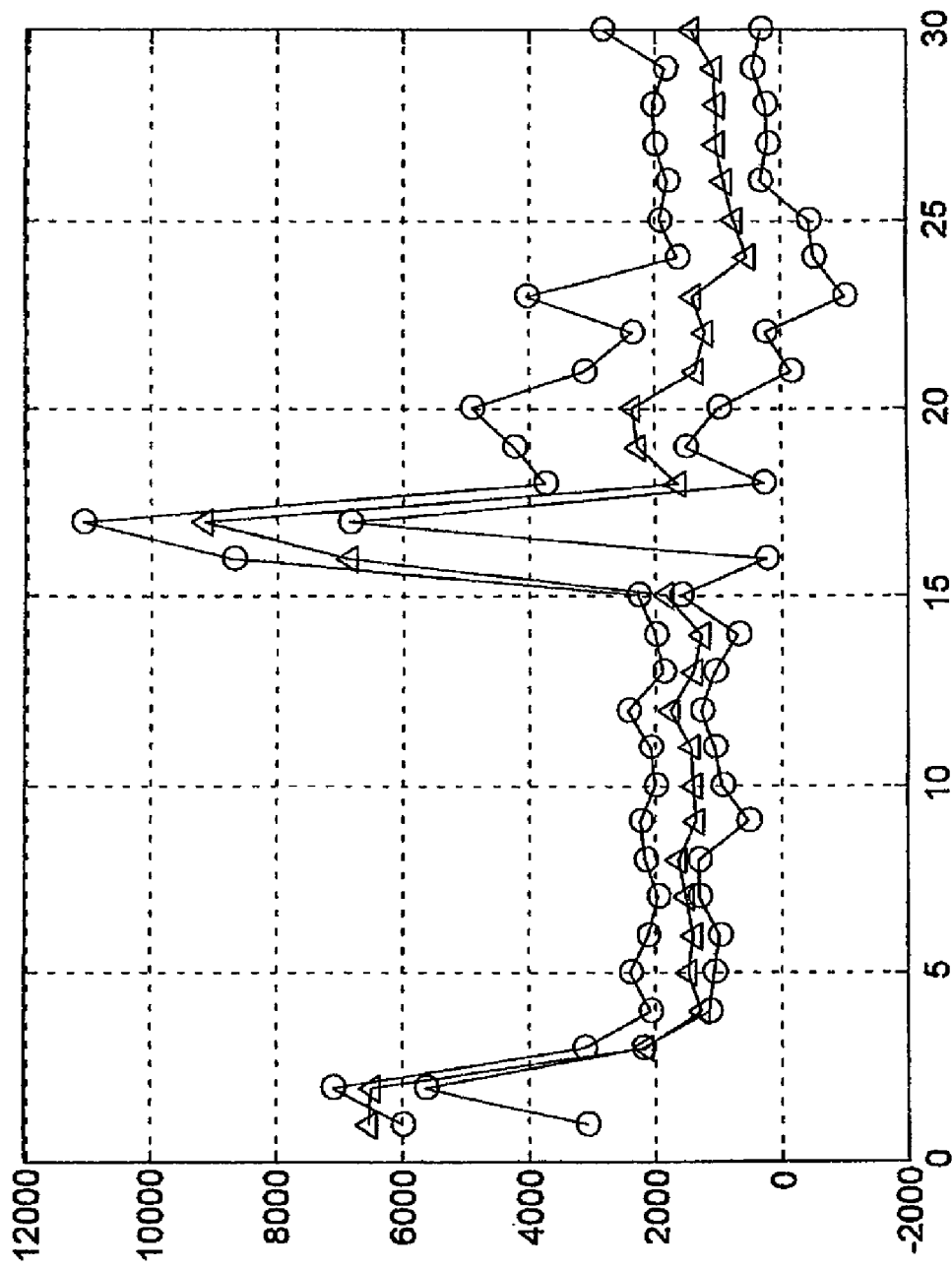

Two candidate fingerprints are shown in FIGS. 8A and 8B. A $\Delta$ represents fingerprint values and a O represents the acceptable distance for the elements of the fingerprint. These distances correspond to 703, 708 and 712 in FIG. 7A. The acceptable distances are different for each element. FIG. 8A shows a reference fingerprint whose values all fall within the acceptable distances. This fingerprint would have made it through to the comparison 717 in FIG. 7B. FIG. 8B shows a candidate fingerprint whose first element falls outside of the acceptable distance. This fingerprint would cause the search to be abandoned after the first element, and the system would report that the candidate fingerprint was not in the database.

Another method to partition a given space is by clustering. In this process, the entire space is separated into several clusters, each of which contains a manageable number of entries. Each cluster is assigned a leader against whom the query is matched (using the L1 measure). The query is deemed to belong to the cluster whose leader has the closest match to the query. In a simple 1-level scheme, the best match is determined from all the entries in the chosen cluster. In a more complex hierarchical scheme, it would be necessary to repeat the process of determining the best cluster several times before the cluster which (ideally) contains the target song is identified.

For purposes of speed and ease of implementation, a measure is needed that is simple, yet effective. The distance between a candidate fingerprint vector and reference fingerprint vector usually consists of a "difference" between the corresponding values of the vectors. This difference may be computed in a variety of ways, including what is called the "L1 distance", which as noted above is the sum of the absolute differences of the corresponding elements of the two vectors being compared:

$$d = \Sigma |FP_{1i} - FP_{2i}|$$

where $FP_{1i}$ is the i-th element of the reference fingerprint and $FP_{2i}$ is the i-th element of the candidate fingerprint.

This type of distance computation weights all the element-by-element distances equally. Consequently, larger differences will have a greater impact on the final sum than smaller distances. In particular, a large difference between fingerprint elements of larger values relative to other fingerprint elements may influence the distance computation greatly. However, on a relative scale, such a large distance may become small due to the large value of the elements being compared.

By taking into account the original size of the fingerprint elements, the distance becomes relative, and it is thus weighted by the size of the fingerprint elements. In mathematical terms, $$d = \sum_i \left| \frac{FP_{1i}}{FP_{2i}} \right|$$

There are several ways to apply the concept of weighted absolute difference for the purpose of comparing two audio fingerprints. The preferred implementations uses the deviation of the arithmetic mean from the geometric mean.

$$d = \frac{1}{N} \sum_{1}^{N} \frac{FP_{1i}}{FP_{2i}} - \sqrt[N]{\prod_{1}^{N} \frac{FP_{1i}}{FP_{2i}}}$$

The first quantity after the summation symbol ($\Sigma$) is the arithmetic mean of the ratios of corresponding elements of the reference and candidate fingerprints, and the second quantity is the geometric mean of the ratios.

Another embodiment of the present invention uses logarithms of the arithmetic and geometric means where the logarithm operation may be in any base:

$$d = \log\left(\frac{1}{N} \sum_{1}^{N} \frac{FP_{1i}}{FP_{2i}}\right) - \log\left(\sqrt[N]{\prod_{1}^{N} \frac{FP_{1i}}{FP_{2i}}}\right) =$$

$$\log\left(\frac{1}{N} \sum_{1}^{N} \frac{FP_{1i}}{FP_{2i}}\right) - \frac{1}{N} \sum_{1}^{N} \log\left(\frac{FP_{1i}}{FP_{2i}}\right)$$

This example uses a natural base logarithm, but other bases such as base 10 and base 2 may be used with similar results.

The above distance computation, using a logarithm of the arithmetic and geometric means, is known in the field of speech recognition as the Itakura distance, and is used to compare the frequency spectra of two speech sounds or the auto regressive (AR) coefficients of an AR model of the speech sounds. The Itakura distance is described in Itakura, F., "Line spectrum representations of linear predictive coefficients of speech signals m" Journal of the Acoustical Society of America, 57, 537 (A), 1975. In the preferred embodiment, this distance computation is applied to two fingerprint vectors, which may be composed of features other than frequency spectra and AR coefficients.

Using this implementation yields better results than the L1 distance in terms of song recognition and robustness to equalization effects. Generally speaking, the reasons for the increased performance are:

Using ratios (i.e. weighted differences) makes the errors relative to a reference vector and limits the effect of one fingerprint value dominating the difference computation.

The ratios in effect help find fingerprints that follow approximately the same profile as the candidate fingerprint, thus yielding a better measure of "similarity" between fingerprints, and therefore, improving the likelihood of matching a candidate fingerprint with the correct reference fingerprint.

Humans hear differences between sounds on a logarithmic scale. Using logarithms reflects more closely how humans perceive sounds. This helps recognize songs that have been processed, for example by applying an equalization scheme, as being the same as songs that have not been processed, thus increasing the recognition rate.

Another embodiment of the present invention uses the sum of absolute values, or the L1 distance. The L1 provides the maximum separation between two different fingerprints. This is critical to increasing the discriminating capacity of the fingerprint. Given $FP_1$ and $FP_2$ of length N, the L1 distance between them is $sum_i abs(FP_1(I) - FP_2(I))$ where I=1, 2, ... N]

A further embodiment of the present invention uses the L2 measure (square root of the sum of square of absolute values). Given $FP_1$ and $FP_2$ of length N, the L2 distance between them is $sqrt(sum_i abs(FP_1(I) - FP_2(I))^2)$ where I=1, 2, ... N Yet another embodiment of the present invention uses the $L\infty$ measure (maximum absolute value). Given $FP_1$ and $FP_2$ of length N, the $L_\infty$ distance between them is $max_i abs(FP_1(I) - FP_2(I))$ where I=1, 2, ... N The objective of tuning the search parameters is to optimize the search efficacy and search speed. There are three types of errors possible: a Type 1 error—the correct fingerprint is in the database but the search returns an incorrect match, a Type 2 error—the fingerprint is in the database but the search returns no match and a Type 1a error—the fingerprint is not in the database but the search returns a wrong match. Search efficacy is defined as the desired balance between false positive, or Type 1 plus Type 1a errors, and false negative, or Type 2 errors. In some applications it may be desirable to minimize total error. In others it may be desirable to minimize only Type 1 or Type 2 errors. Tuning is achieved by varying the L1 cut-off thresholds, the SRR thresholds and the ordering of entries in the fingerprint for the SRR. SRR ordering may be the same as fingerprint element ordering, and has been described in an earlier section.

The L1 cut-off is the final criterion to determine a match, and as such, directly impacts the Type 1 and Type 2 errors. A generous threshold is likely to increase Type 1 (including Type 1a) errors, while a tight threshold is likely to increase Type 2 errors.

In the preferred embodiment of the present invention the threshold is selected based on the relative spread of the fingerprints by computing intra-song and inter-song distances for a set of songs. The songs are chosen to be representative of all songs and all variants. For every variant, the intersection of the distributions of the correct match (measure of intra-song distance), and the best non-match (measure of inter-song distance), provides insight into how large the cut-off can be set before the Type 1 errors creep up to unacceptable levels. Based upon the songs sampled, the preferred threshold is between 0.15 and 0.3, in particular, 0.30 minimized the sum of Types 1, 1a and 2 errors in a test using a data set of approximately 5,447 records, as shown in Table 1. FIGS. 9A-9D provide examples of the distributions of the correct match and the second best match for the data set of 5447 songs in four formats. The second best match is chosen if the best match is not in the database, and this contributes to Type 1a error. If there is overlap between the distances between the best and second-best matches, the second-best match will sometimes be chosen, and this may contribute to Type 1 error.

TABLE 1

| Threshold | Type 1 | Type 1a | Type 2 | Total | Type 2 (w/o Blade32) | Total (w/o Blade32) |
|---|---|---|---|---|---|---|
| 0.30 | 0.099% | 0.19% | 0.685% | 0.97% | 0.09% | 0.38% |
| 0.25 | 0.039% | 0.036% | 1.34% | 1.42% | 0.16% | 0.235% |
| 0.20 | 0.026% | 0% | 2.91% | 2.94% | 0.28% | 0.31% |
| 0.15 | 0.004% | 0% | 6.1% | 6.1% | 0.53% | 0.53% |

It was assumed that users would tolerate a Type 2 error rate of 1.5% or less. Based on this, we chose a threshold of 0.25 to minimize Type 1 and Type 2 errors. As the database is scaled up, Type 1 errors are likely to become the most significant driving force in determining the threshold, because as the multi-dimensional space gets more crowded, Type 1 errors are significantly impacted. Type 2 errors are a lot less affected by scaling and are not likely to increase significantly as the database size is increased.

The first step in choosing the SRR thresholds is determining a method to compute the SRR threshold vector. In the preferred embodiment of the present invention thresholds for every value in the fingerprint are set based on the observed spread of those values across all songs in the sample set for each value in the fingerprint. Specifically, for every song in the sample set, the standard deviation is computed across the variants for that song for every value of the fingerprint vector. This provides a distance. The threshold for every point in the fingerprint vector is then set as some multiple of that distance. The preferred values are shown in table 2.

Another embodiment of the present invention uses the standard deviation of the error of the FP values, where the thresholds for every value in the fingerprint are based on the distance between the reference fingerprint and the fingerprint from its variants.

Next, the threshold scaling factor is determined. The search time for the SRR increases in direct proportion to the size of $\Phi$ (705 in FIG. 7A). To achieve acceptable speeds, the size of $\Phi$ (the set of elements after the SRR search) needs to be as small as possible. Setting tight SRR thresholds greatly reduces the size of $\Phi$, but increases the risk of ending with empty sets, resulting in large Type 2 errors. Therefore the process of determining the threshold scaling factor is an optimization process.

Figure 10A:
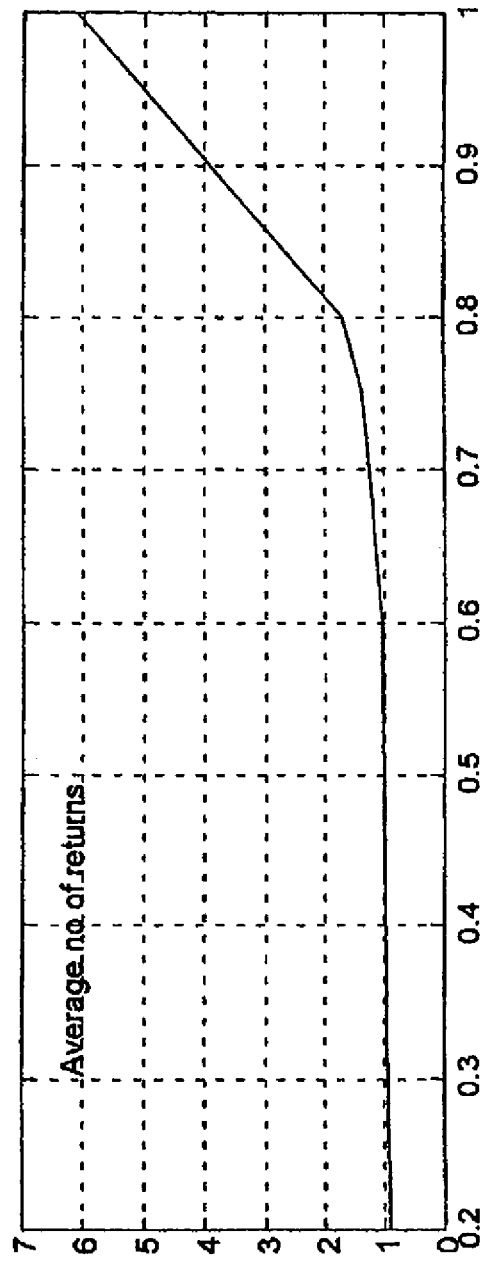
FIG. 10A is a graph of the efficacy of Search by Range Reduction.

One way of implementing the preferred method is to graph the average number of returns as a function of the SRR threshold, using a set of songs and variants. An example such a graph is provided in FIG. 10A. A point is chosen which provides the best trade-off between total error (accuracy) and the number of SRR returns (speed). Note that a smaller threshold reduces the number of SRR returns resulting in faster search times but is associated with higher total error. The graph in FIG. 10A shows a sharp increase in returns after 0.8 of the standard deviation of the FP. This implies the threshold should be set at 0.8 T, where T is computed using the STD of FP, as the optimal point beyond which the average number of returns from a Search by Range Reduction show a sharp increase.

Figure 10B:
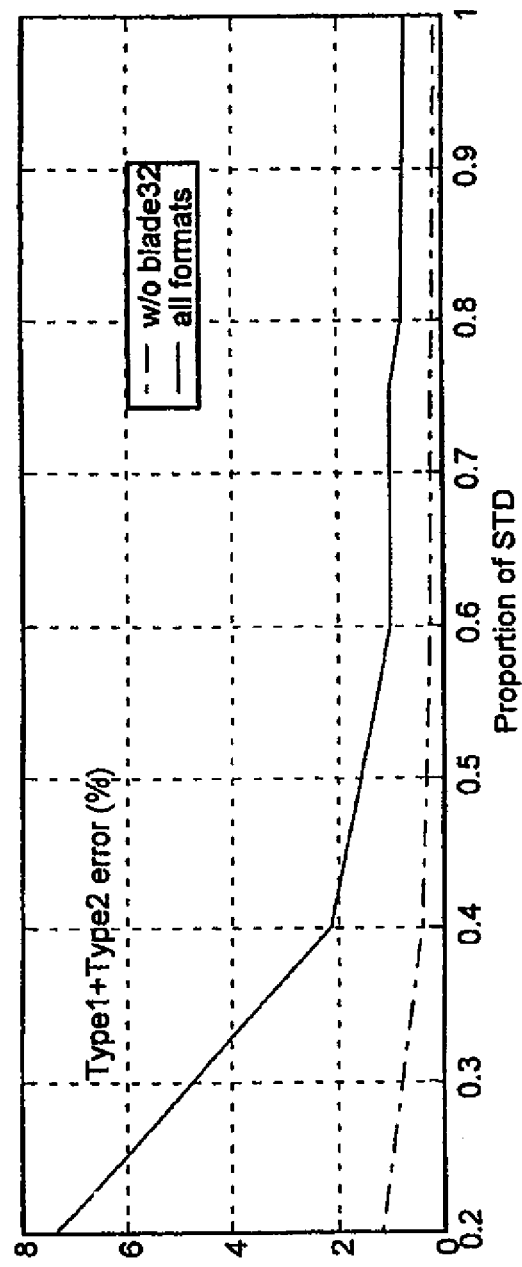
FIG. 10B is a graph of total error (type 1+type 2) as a function of the Search by Range Reduction threshold.

In another method, a point is chosen at which the errors decrease below a chosen threshold. FIG. 10B shows a graph of errors versus proportion of the standard deviation. There is an inflection at about 0.4 of the standard deviation, and this could be chosen as the threshold. The goal is to select the value giving the least error with acceptable number of SRR returns. Basically, performance is judged based on both accuracy and speed. Trade-offs can be made between accuracy and speed, depending on the situation, based on the threshold scaling factor that is selected.

TABLE 2

| | STD FP | |
|---|---|---|
| FP element | Decimal | 15-bit integer |
| 1 | 0.0448 | 1468 |
| 2 | 0.0222 | 729 |
| 3 | 0.0147 | 481 |
| 4 | 0.0146 | 477 |
| 5 | 0.0305 | 673 |
| 6 | 0.0176 | 578 |
| 7 | 0.0201 | 331 |
| 8 | 0.0136 | 447 |
| 9 | 0.0265 | 868 |
| 10 | 0.0162 | 530 |
| 11 | 0.0156 | 513 |
| 12 | 0.0177 | 582 |
| 13 | 0.0122 | 401 |
| 14 | 0.0199 | 652 |
| 15 | 0.021211 | 365 |
| 16 | 0.1293 | 4238 |
| 17 | 0.0650 | 2130 |
| 18 | 0.0532 | 1743 |
| 19 | 0.0420 | 1375 |
| 20 | 0.0600 | 1965 |
| 21 | 0.0503 | 1648 |
| 22 | 0.0325 | 2065 |
| 23 | 0.0774 | 2537 |
| 24 | 0.0328 | 2075 |

TABLE 2-continued

| | STD FP | |
|---|---|---|
| FP element | Decimal | 15-bit integer |
| 25 | 0.0366 | 1200 |
| 26 | 0.0227 | 743 |
| 27 | 0.0275 | 901 |
| 28 | 0.0274 | 899 |
| 29 | 0.0213 | 697 |
| 30 | 0.0384 | 1257 |

When searching a large database (over one million records) of reference fingerprints, one challenge is to retrieve the best match to a candidate fingerprint in a reasonable time. There are two relevant methods to consider: exact match and inexact or fuzzy match. Performing an exact match is feasible if the candidate fingerprint is unaffected by any induced effects. The resultant fingerprints can be used as hash keys and entered into a hash table of reference fingerprints. This is the optimal method to search in large databases owing to its scalability, simplicity and lack of ambiguity (direct table look-up). However, codecs, compression rates, audio effects and other delivery channel effects change the candidate fingerprints. The result of a hash table lookup is binary and thus, either something is, or is not, the exact match. Even a slight change in a candidate fingerprint will result in the absence of a match if that exact reference fingerprint is not in the database. To identify all variants of a sound recording, a fingerprint of each variant must be in the database. For many applications this is impractical. For some applications, like broadcast stream monitoring where the start point for candidate fingerprint extraction is variable, this is impossible. Attempts to create a hash key from a fingerprint of this type, for example by quantizing the values, will result in a degradation of accuracy. In sum, exact searching is fast, but inflexible.

An inexact or fuzzy match uses a measure of closeness or similarity between a candidate fingerprint and the reference fingerprints. Thus, different candidate fingerprints that are slight variants of a reference fingerprint can be resolved to one reference fingerprint, and the reference fingerprint can be identified. If such a match required the computation of a distance measure between each candidate fingerprint and every reference fingerprint in the database, it would be impractical to perform the search on a large scale. As described above, there are intelligent search methods that reduce the size of the search space to a manageable size, and allow this technique to be scaled. However fuzzy searching is not as fast as exact matching. In sum, it is flexible but slow.

The preferred embodiment uses a technique that combines the identification power of a fuzzy search with the speed of exact matching using an LRU (Least Recently Used) cache. An LRU cache is similar to the kind of cache used by a web browser. New items are placed into the top of the cache. When the cache grows past its size limit, it throws away items off the bottom. Whenever an item is accessed, it is pulled back to the top. The end result is that items that are frequently accessed tend to stay in the cache.

A typical fingerprint lookup, which consists of the time required to send a request and receive a response at the client side, normally takes 1-2 seconds. Using server caching, subsequent lookups occur in a small fraction of the time required to perform an initial lookup. For example, if the initial lookup of a song takes 0.764 seconds, subsequent lookups of the same song would typically only take 0.007 seconds. In the preferred embodiment, the server cache stores a total of 30 million fingerprint variants for approximately 600,000 of the most recently requested songs (based on an average of 500 variants of each song).

Fingerprints are sent to the LRU cache for identification before being sent to the database. At system initiation all fingerprints are looked up in the database, but once a fingerprint has been identified it goes to the LRU. The cache fills up and the system speed increases as the majority of candidate fingerprints are identified in the LRU cache.

The request cache was selected based on information that roughly 1 in 20 searches would be for unique variants, and hence require an SRR search. The remaining 19 in 20 can be handled via a simple cache lookup. This architecture combines the capability of a database search with the speed of a hash lookup.

Figure 11:
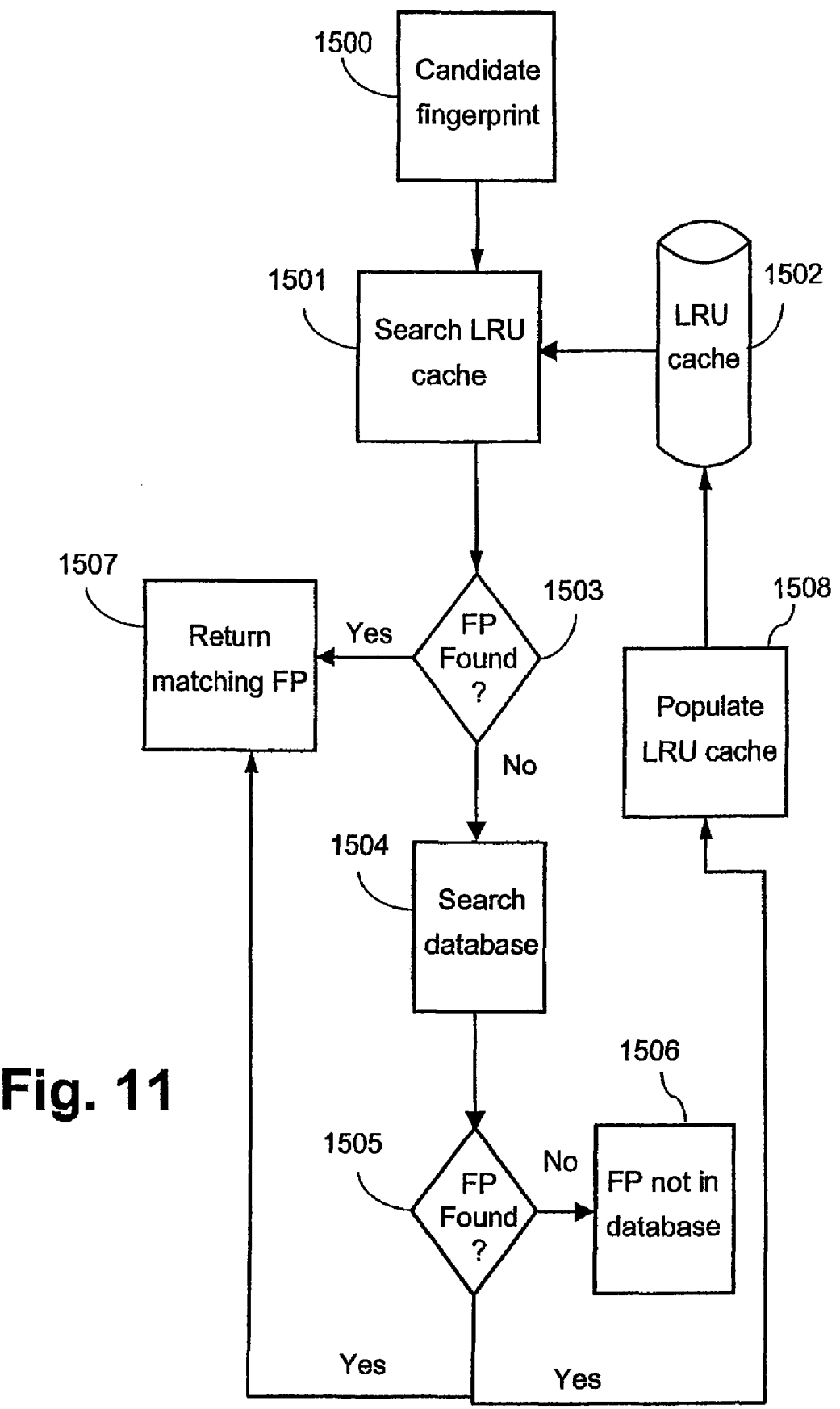
FIG. 11 is flowchart of a procedure for combining fuzzy and exact matches between candidate and reference fingerprints.

The preferred embodiment uses the following sequence, illustrated in FIG. 11:

(1) A candidate fingerprint 1500 is sent to the system.
(2) The fingerprint is searched 1501 against an LRU cache 1502.
(3) If an exact match for the candidate fingerprint is not found 1503, a search 1504 is launched in the database.
(4) If a match is not found 1505 in the database, a response 1506 is generated indicating that the fingerprint is not in the database.
(5) If a match is found 1505 in the LRU or the database, the matching fingerprint is returned 1507.
(6) If a match is found in the database, the matching fingerprint is used to populate 1508 the LRU cache 1502.

The methods and system disclosed herein can be used to identify streams of music, such as a radio broadcast, where the start point is not known. There are two methods of identifying a stream. In one method multiple fingerprints are extracted from the entire length of a reference song. Streams to be identified have fingerprints extracted at regular intervals, and those candidate fingerprints are searched against the database. In another method, a robust set of events or breakpoints are identified in the original, and fingerprints are extracted and placed in the reference database around that breakpoint. The breakpoints are detected using features that are robust to audio manipulations, that are easy to extract, and that permit detection with a simple lookup scheme that does not require intensive database search. The advantage of using breakpoints is that the reference database does not require as many fingerprints, and the amount of database lookup is reduced.

Whichever method is used, identifying streams imposes stringent accuracy requirements on the system. This is because there are more fingerprints in the database, and more fingerprints being sent to the database. Thus, even a small percentage error will lead to a large number of incorrect responses.

The idea of using multiple fingerprints arose out of a need to meet the very stringent accuracy requirements of stream identification. The main idea here is that the use of multiple fingerprints will help to reduce the mismatch errors (Type 1 and Type 1a) that occur with the use of only one fingerprint. It adds a level of certainty to the result that one cannot obtain with just one fingerprint. This is especially relevant with respect to the broadcast (streaming) audio scenario where it is difficult to get accurate time alignments between the broadcast audio and the original song. Also, the broadcast audio signal is oftentimes a modified version of the original CD audio.

There are two instances of multiple fingerprints:
(1) Multiple fingerprints of every song in the DB with fingerprints taken at different locations, because the candidate fingerprint will be extracted from some unknown point. By having multiple fingerprints in the DB, the probability of finding a match is improved, since it will now be more likely that the portion of the broadcast contains at least one of the portions of the song in the DB that were fingerprinted. This is important to reduce the Type 2 errors.
(2) Impose the condition of multiple (consecutive) matches to the candidate fingerprints. The idea here is that the candidate signal is fingerprinted at regular intervals or frames. Each fingerprint is tested against the DB of fingerprints. A match is recorded only if several such consecutive fingerprints match the same song in the DB. This approach works owing to two main principles: (a) Fingerprints exhibit little variation from frame to frame as long as the frame is small. (b) Enforcing multiple matches greatly reduces the possibility of a mismatch, which serves to reduce Type 1 and Type 1a errors.

It is important to stress here that the multiple fingerprint approach is a search method. It helps to improve the performance (in terms of error rates) obtained using a given fingerprint, when compared with what can be obtained with the single match approach using the same fingerprint. To that extent, the final performance will be limited by the efficacy of the actual fingerprint used. This method will work best for radio broadcasting when used with a fingerprint that is designed to be robust to "radio effects".

The motivation behind the use of a multiple consecutive match criterion was that a fingerprint from a song between [t0, t1], is highly likely to match the fingerprint of the same song in a small neighborhood δ of the portion [t0, t1], i.e., any portion of the candidate from [(t0−δ), (t1−δ)] to [(t0+δ), (t1+δ)] will result in a match with the original song in the database.

Figure 12:
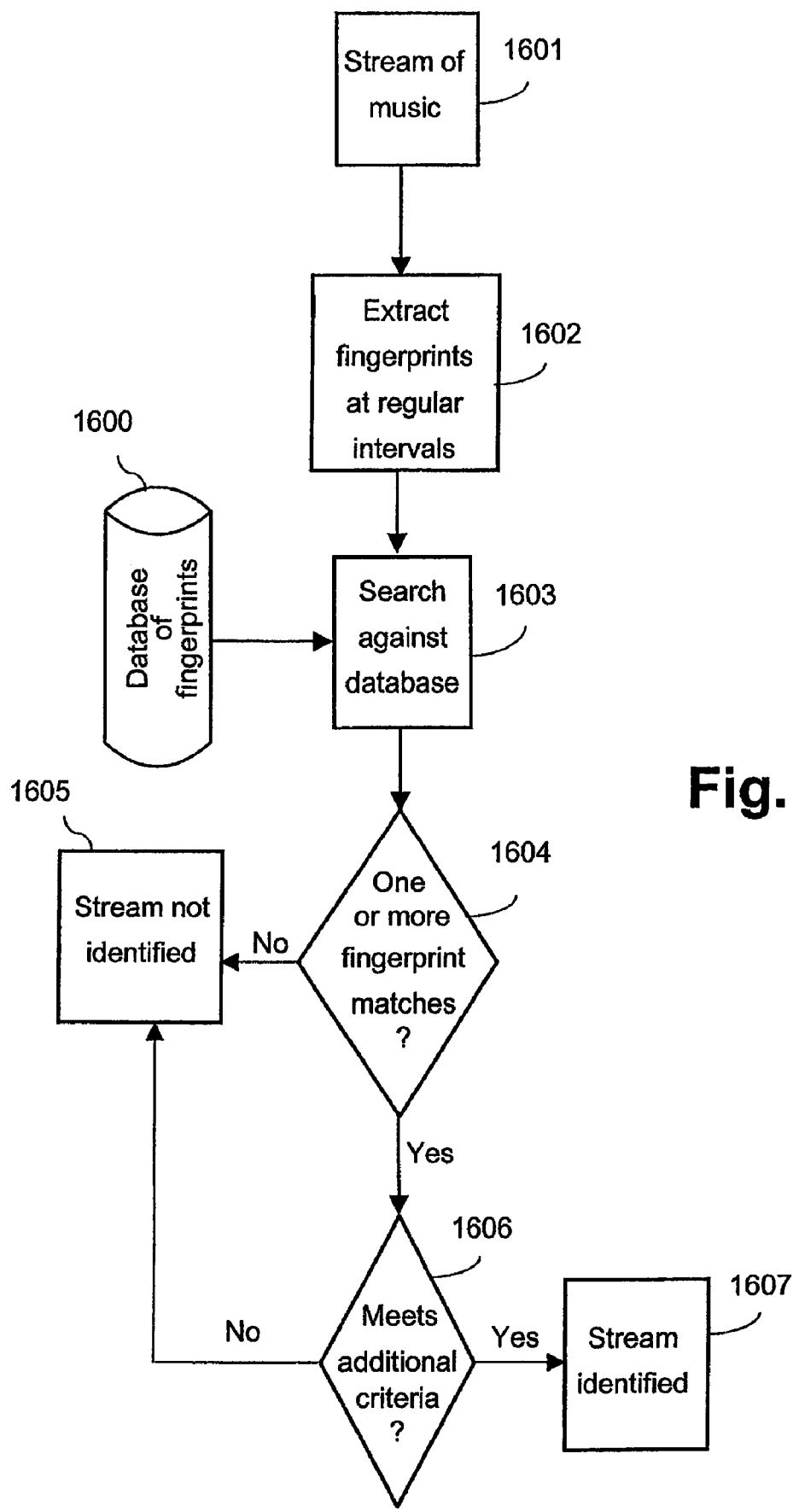
FIG. 12 is flowchart of a procedure for using fingerprints to identify a stream of music.

One method for identifying streams is illustrated in FIG. 12, and described below:
(1) Populate the database of fingerprints 1600, with fingerprints taken from M unique songs, known as the "original" song set. These could be the CD version of the songs or whole songs extracted directly from the radio broadcast. The fingerprints are typically taken at regular known intervals in the song, and each song can have one or more fingerprints. The size of the DB will now be NM, where N is the number of fingerprints taken per song.
(2) Starting at some random point in the stream 1601, extract 1602 a fingerprint every frame, where a frame is typically between 1-5 seconds. The preferred method uses a frame of 3 seconds. In another method the frame duration is dependent on the stationarity of the fingerprint. If the fingerprint shows little variation with time, then a larger frame size is chosen, else a smaller frame size is chosen. Since it has been shown that the fingerprints under consideration are robust up to at least 0.5 seconds, preferably the smallest frame is 1 second.
(3) The fingerprint extracted from the candidate is matched 1603 against the database 1600 of NM fingerprints. Any measure of match could be used such as the L1 norm, L2 norm, Itakura distance, etc.
(4) If there is no match 1604, the stream is not identified 1605. A match results if the closest fingerprint in the DB falls below some preset distance threshold of the candidate fingerprint.
(5) If one or more fingerprints match, additional criteria are applied 1606. For example, a match is recorded if P consecutive candidate fingerprints match with the same song in the DB. P is a search parameter and is a function of the error rates desired and the stationarity of the fingerprint. Typically, it ranges from 1 to 10. A larger value of P would likely reduce the possibility of a mismatch, but might lead to unacceptable Type 2 error rates.

Figure 13A:
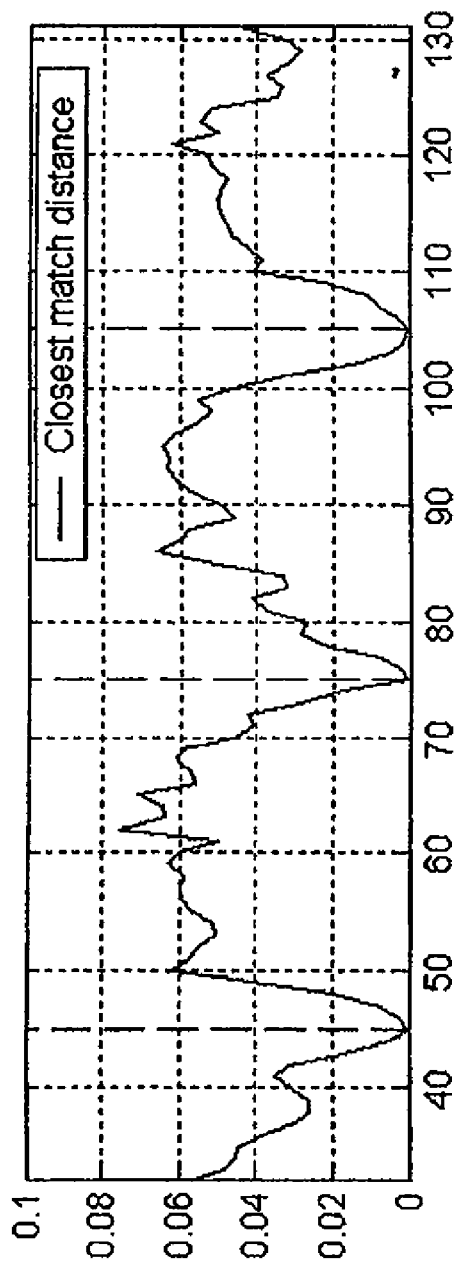
FIG. 13A is a graph of the distance of the closest match based on extracting one fingerprint every second from a sample song.
Figure 13B:
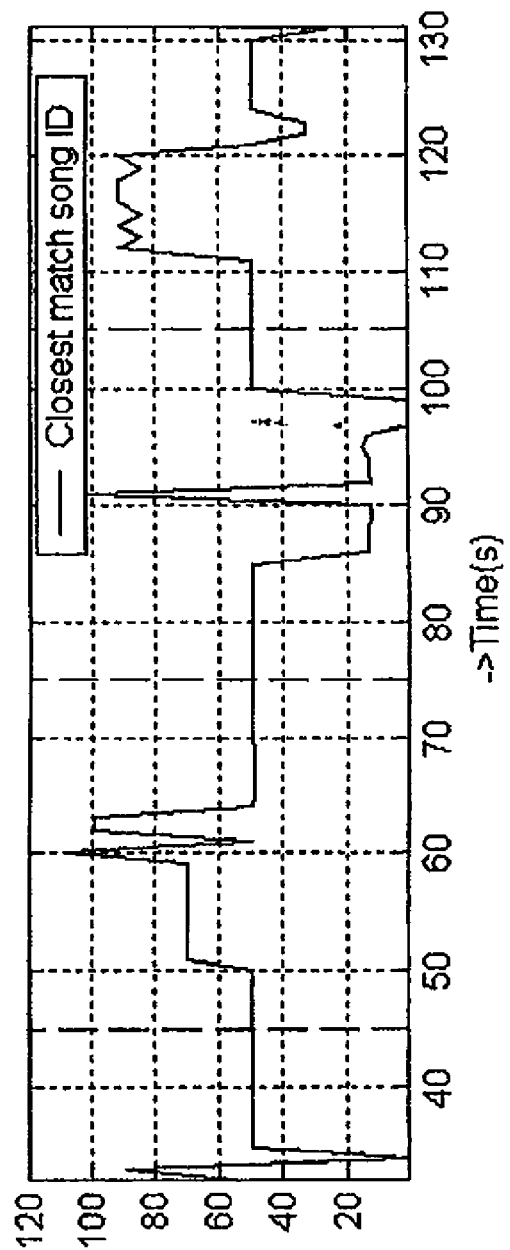
FIG. 13B is a graph of the song ID in the database corresponding to the closest match in FIG. 7A.

Results of the search procedure illustrated in FIG. 12, and described above, are illustrated in FIGS. 13A and 13B. FIG. 13A is a graph of the distance of the closest match, FIG. 13B is the song ID in the database corresponding to the closest match. The vertical lines indicate the locations in the reference songs where the fingerprints in the database were extracted. The correct match is song number 50, out of 119 songs. The distance plots exhibit marked dips at the locations corresponding to the fingerprints in the database. This behavior is exploited to greatly reduce the possibility of a mismatch.

The method used to detect/identify breakpoints is based on a wavelet analysis of the signal. The continuous wavelet transform (CWT) of a signal is a representation of the signal in time shifts (position in signal starting from the first sample point) and scale (scale can loosely be thought of as the inverse of frequency and controls the resolution). It provides frequency information about the signal at different time instances. To understand this better, time shift may be denoted by b and scale by a. The CWT is then a function of a and b. The CWT coefficient for some scale a0 and time b0 is a measure of the variation that occurs in the signal in the time range corresponding to a0 centered at the location b0, where b0 is the shift in the input signal starting from the first sample point. Thus, a larger variation accounts for a larger magnitude CWT coefficient. For a signal sampled at say, 11025 Hz, the CWT coefficient at a scale $2^{10}$ (it is common to specify scales as powers of 2) and time shift 15000, is a measure of the variation which occurs in the input signal in a neighborhood of $2^{10}/11025=0.09$ s centered at $15000/11025=1.36$ seconds.

The CWT has two important properties which render it useful for the present invention:
(1) The CWT coefficient magnitude relates directly to changes in the signal. Points in the signal that have a change are associated with large valued CWT coefficients at that location across frequencies associated with the change. Note that a rapid (sudden) change corresponds to a higher frequency than a smoother change.
(2) If a change is indeed significant (perceptually salient), it persists across a range of scales. Isolated changes in the signal, such as noise, tend to be isolated in the CWT domain as well, appearing as high valued CWT coefficients only at the scale corresponding to the frequency of the noise. Typically, music signals have changes in them which last for some duration, and which can be felt in some neighborhood around them. This results in such a change being reflected in the CWT coefficient magnitudes for the range of scales covering that neighborhood with the finest (smallest) of these scales corresponding to the actual duration of the change.

Importantly, since the CWT is a time-scale representation, the above properties combined together make it possible to zoom in on the exact location of the change (up to some precision) based on the persistence of large-valued CWT coefficient magnitudes across the range of scales of interest, since all the magnitudes need to line up across different scales at the exact same location.

The algorithm used to compute the breakpoints is based upon the above mentioned properties of the CWT. The actual procedure is as follows:

(1) For a fixed sample of a given song, compute the CWT at a set of optimal scales. The Haar wavelet transform was used to compute the coefficients owing to its simplicity and superior power at detecting changes. Keeping in mind practical constraints on buffer size, the sample size was restricted to 5 seconds.

(2) Compute the aggregate power using magnitude squared of the CWT coefficients, i.e., $(c(a, b))^2$, over small non-overlapping windows. The size of the window chosen essentially limits the resolution of the breakpoints determined, but aggregation is needed to provide robustness to the breakpoints.

(3) Normalize the aggregate function across time for every scale.

(4) Compute the sum of these normalized functions across scales.

(5) Identify the location and value of the maximum of this sum across the fixed sample.

(6) If the maximum value is greater than some preset threshold, then the corresponding location is determined to be a breakpoint for that sample.

The results of the preceding algorithm were tested using 95 songs. Breakpoints in the songs were first detected by ear. The rationale for human detection was that if the breakpoints could be detected by ear, then it is likely they would survive most auditory manipulations. The 95 songs were subjected to auditory manipulation by being encoded at different bit rates and with different codecs, before being decoded back to .wav format, and inserted into the breakpoint detector.

Figure 14:
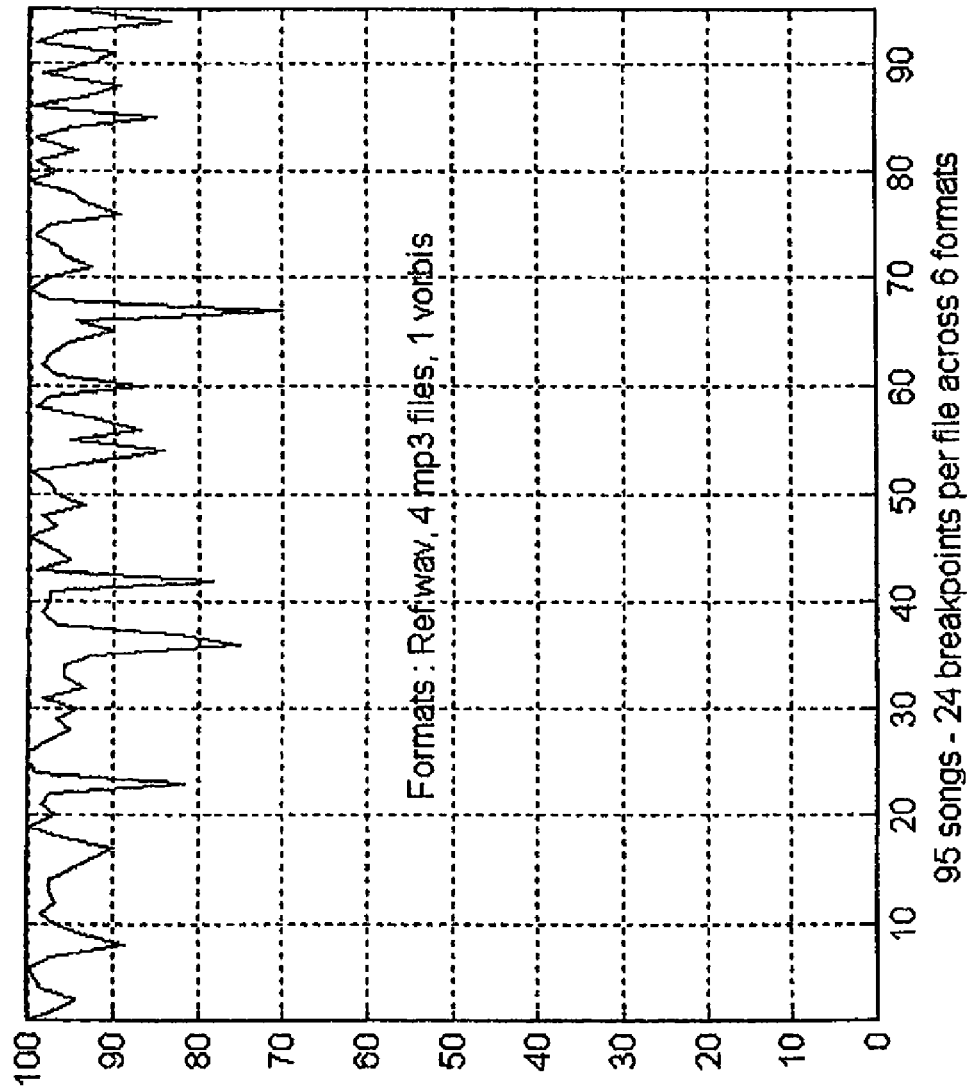
FIG. 14 is a graph of percentage agreement between machine-extracted and human-extracted breakpoints (accuracy) for 95 songs.

FIG. 14 shows the results of a comparison between the machine-extracted and human-extracted breakpoints. A machine-extracted breakpoint was considered accurate if it occurred within +/−0.5 sec of human-extracted breakpoint. The average accuracy is above 95%, with some songs having 100% accuracy. The accuracy was higher when artificial machine-extracted breakpoints were removed. Artificial breakpoints were generated because the algorithm forced a breakpoint every 5 seconds.

There are applications for a method to identify an entire song. For example, if the entire song must be checked to ensure that it is all present and correct. In order to accomplish this type of search effectively, a small fingerprint is desirable. Reasons for this requirement include:

(1) Quality assurance: the rights owner of a song, or an artist, may wish to assure that their song is only distributed in its entirety.

(2) Prevention of spoofing: spoofing, or attempting to misrepresent an identification system, may be a tactic used to distribute songs illegally over a network. If a fingerprint is taken from a small section of the song, say in the front, someone trying to spoof the system might prepend a section of a legal song onto the front of an illegal song.

Figure 15A:
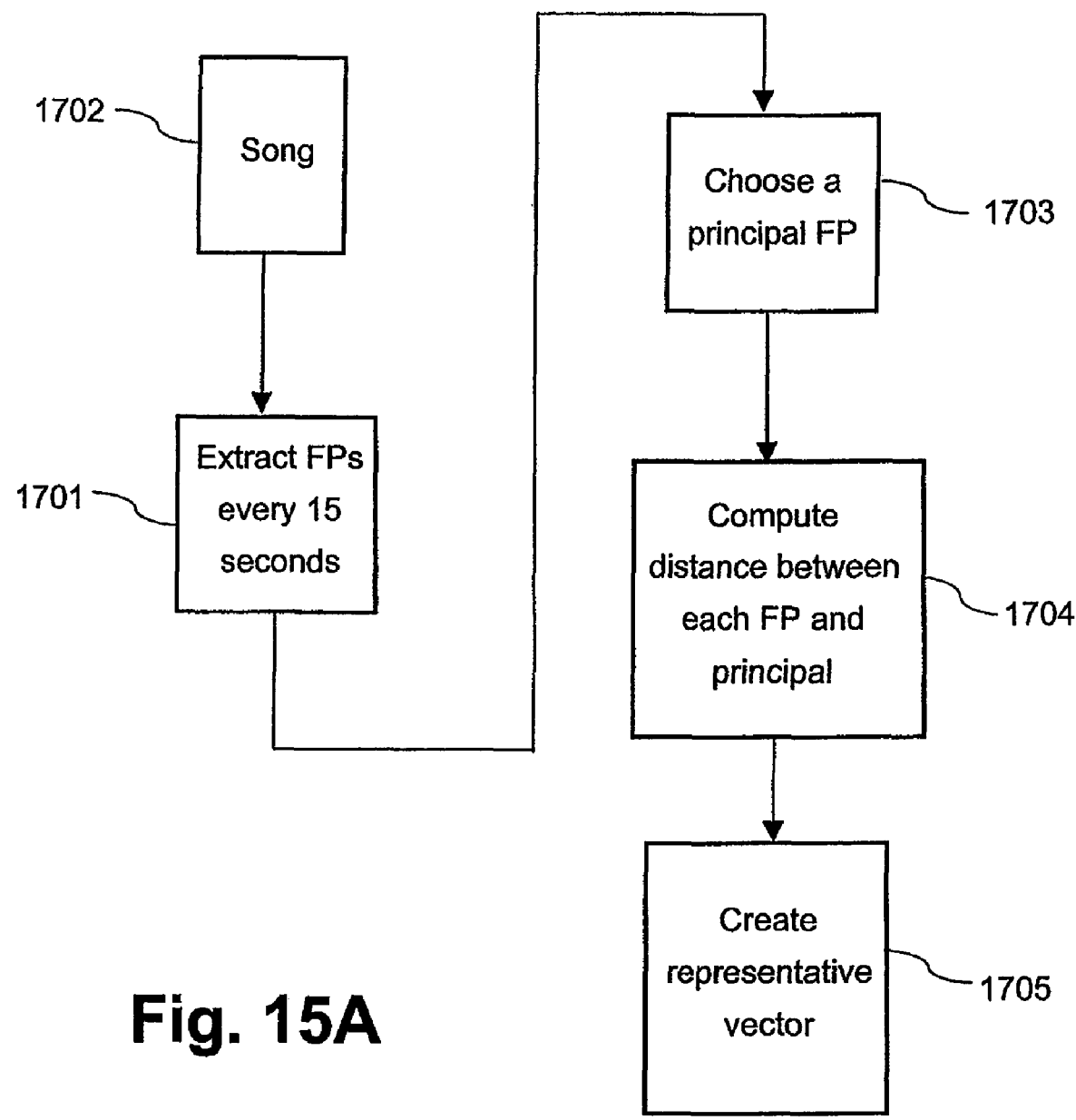
FIG. 15A is flowchart of a procedure for representing an entire song as a compact vector.

To accomplish this type of search effectively, a small fingerprint is desirable. A method for representing an entire song compactly is described below. This method uses a two stage fingerprinting approach, illustrated in FIGS. 15A and 15B.

(1) Stage 1—Generate 1701 fingerprints for the entire song 1702. One of those fingerprints is chosen 1703 as the principal fingerprint.
  (a) The preferred method uses the time frequency analysis described above.
  (b) Another method uses the wavelet-based analysis described above.

Figure 15B:
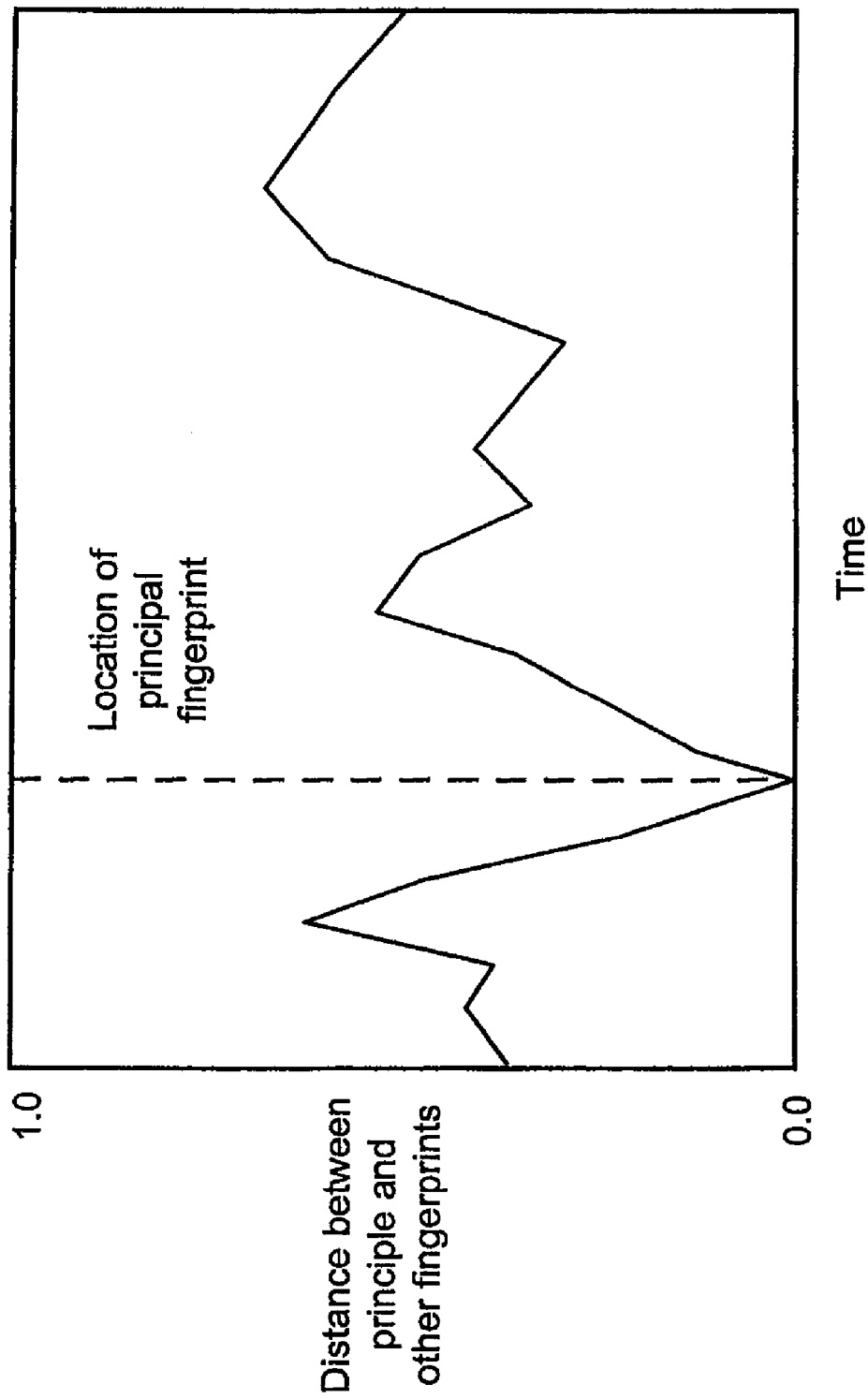
FIG. 15B is graph of the procedure illustrated in FIG. 15A.

(2) Stage 2—Generate a complete reference song fingerprint (profile)
  (a) Compute 1704 the distance between each fingerprint and the principal fingerprint. An example of these distances are shown in FIG. 15B. The entire song is then represented 1705 by concatenating the fingerprint, its location, and the distances into one vector. Using the 30 element 15-second fingerprint described above, an entire 3 minute song could be represented in a total of 72 bytes, comprised of 60 bytes (two bytes per fingerprint element)+one byte (location of principal fingerprint)+11 bytes (11 distances between each of 12 fingerprints and the principal fingerprint).
  (b) Another method uses a simple measure, like relative song power from different portions with respect to the portion from which the principal fingerprint was extracted, and uses this as the profile.

The method then uses the principal fingerprint as the chief identifier for a song in the database. Then, the complete song profile is used to verify the identification and authenticate the complete song.

The methods described above may be implemented on many different types of systems. For example, the database may be incorporated in a portable unit that plays recordings, or accessed by one or more servers processing requests received via the Internet from hundreds of devices each minute, or anything in between, such as a single desktop computer or a local area network. A block diagram of the basic components of such systems is illustrated in FIG. 16. A processor 1602 receives candidate song(s) or candidate fingerprint(s) from I/O unit 1604 that are compared with records in a database maintained on storage unit 1606, using any of the methods described above. The records in database 1606 may be generated from original recordings, e.g., compact discs or other digital sound files from distributors licensed by the copyright owner, or from copies of the original recordings. According to the invention, a sufficiently robust reference fingerprint can be generated to identify copies of an original recording that have been modified differently than the copy of the original recording used as a reference recording.

Regardless of the source of the reference fingerprints, preferably the fingerprints read from database 1606 are cached in RAM 1608. The results of an identification search may be output locally on display 1610 or transmitted over a network (not shown) via I/O unit 1604 to a remote device which may or may not have supplied the candidate song or candidate fingerprint(s). The RAM 1608 and storage unit 1606, or other permanent or removable storage (not shown), such as magnetic and optical discs, RAM, ROM, etc. also stores the process and data structures of the present invention for execution and distribution. The processes can also be distributed via, for example, downloading over a network such as the Internet.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A computer-implemented method comprising:
identifying a leader fingerprint as a cluster leader to represent a subset of fingerprints included in a cluster of fingerprints forming part of a plurality of fingerprints extracted from multiple media files;

calculating, by a processor of a media processing machine, a mathematical distance between a query fingerprint and the leader fingerprint, wherein the mathematical distance between the query fingerprint and the leader fingerprint comprises a first mathematical distance; and determining that the query fingerprint corresponds to the cluster of fingerprints, the determining based on the mathematical distance, wherein the identifying comprises calculating a second mathematical distance between the query fingerprint and an additional fingerprint of the cluster.

2. The computer-implemented method of claim 1, wherein the first mathematical distance is determined using a first distance measurement function, and wherein the second mathematical distance is determined using a second distance measurement function.

3. The computer-implemented method of claim 1, wherein the query fingerprint comprises a first vector of first values and the additional fingerprint comprises a second vector of second values, and wherein the identifying comprises:
calculating a sum of absolute values comprising an absolute difference between at least one of the first values and at least one of the second values.

4. The computer-implemented method of claim 1, further comprising:
partitioning the plurality of fingerprints into multiple clusters, the multiple clusters including the cluster comprising the subset.

5. The computer-implemented method of claim 4, wherein the partitioning comprises:
generating a hierarchy associated with the multiple clusters.

6. The computer-implemented method of claim 1, wherein the cluster of fingerprints includes a sub-cluster of fingerprints, further comprising:
determining that the query fingerprint corresponds to the sub-cluster of fingerprints.

7. The computer-implemented method of claim 1, wherein the leader fingerprint comprises a first vector of first values and the query fingerprint comprises a second vector of second values, and wherein the mathematical distance comprises a vector difference between the first and the second vectors.

8. The computer-implemented method of claim 1, wherein each fingerprint in the cluster of fingerprints comprises a vector of values, wherein the determining is based on a threshold comparison with the mathematical distance, further comprising:
generating the threshold based on an aggregate of values corresponding to the vectors of values in the cluster of fingerprints.

9. The computer-implemented method of claim 8, wherein the generating comprises:
calculating a standard deviation based on the aggregate of values corresponding to the vectors of values in the cluster of fingerprints.

10. The computer-implemented method of claim 7, wherein the determining comprises:
calculating a maximum of absolute values, each of the absolute values comprising an absolute difference between at least one of the first values and at least one of the second values.

11. The computer-implemented method of claim 7, wherein the determining comprises:
calculating a sum of absolute values comprising an absolute difference between at least one of the first values and at least one of the second values.

12. The computer-implemented method of claim 7, wherein the determining comprises:
calculating a difference between an arithmetic mean and a geometric mean, the arithmetic mean and the geometric mean derived from the first values and the second values.

13. The computer-implemented method of claim 7, wherein the determining comprises:
calculating logarithms of an arithmetic mean and of a geometric mean, the arithmetic mean and the geometric mean derived from the first values and the second values.

14. The computer-implemented method of claim 7, wherein the determining comprises:
calculating a square root of a sum of squares of absolute values, each of the absolute values comprising an absolute difference between at least one of the first values and at least one of the second values.

15. A system comprising:
a storage unit to store a cluster of fingerprints, the cluster comprising a subset of a plurality of fingerprints extracted from multiple media files; and
a processor communicatively coupled to the storage unit, the processor to access at least some of the cluster of fingerprints, to identify a leader fingerprint of the cluster as a cluster leader to represent the subset, to calculate a mathematical distance between a query fingerprint and the leader fingerprint, and to determine that the query fingerprint corresponds to the cluster of fingerprints, the determining based on the mathematical distance, wherein the mathematical distance between the query fingerprint and the leader fingerprint comprises a first mathematical distance, wherein the processor is to calculate a second mathematical distance between the query fingerprint and an additional fingerprint of the cluster, wherein the first mathematical distance is determined using a first distance measurement function, and wherein the second mathematical distance is determined using a second distance measurement function.

16. The system of claim 15, wherein the processor is to partition the plurality of fingerprints into multiple clusters, the multiple clusters including the cluster comprising the subset.

17. A system comprising:
a storage unit to store a cluster of fingerprints, the cluster comprising a subset of a plurality of fingerprints extracted from multiple media files; and
a processor communicatively coupled to the storage unit, the processor to access at least some of the cluster of fingerprints, to identify a leader fingerprint of the cluster as a cluster leader to represent the subset, to calculate a mathematical distance between a query fingerprint and the leader fingerprint, and to determine that the query fingerprint corresponds to the cluster of fingerprints, the determining based on the mathematical distance, wherein the leader fingerprint comprises a first vector of first values, the query fingerprint comprises a second vector of second values, the mathematical distance comprises a vector difference between the first and the second vectors, and the processor is to calculate a sum of absolute values comprising an absolute difference between at least one of the first values and at least one of the second values.

18. A non-transitory machine-readable storage medium comprising instructions that, when executed by one or more processors of a machine, cause the machine to perform a method comprising:
identifying a leader fingerprint as a cluster leader to represent a subset of fingerprints included in a cluster of fingerprints forming part of a plurality of fingerprints extracted from multiple media files;

calculating a mathematical distance between a query fingerprint and the leader fingerprint, wherein the mathematical distance between the query fingerprint and the leader fingerprint comprises a first mathematical distance; and determining that the query fingerprint corresponds to the cluster of fingerprints, the determining based on the mathematical distance, wherein the identifying comprises calculating a second mathematical distance between the query fingerprint and an additional fingerprint of the cluster.

19. A system comprising:

a storage unit to store first and second reference fingerprints; and a processor communicatively coupled to the storage unit, the processor to extract first and second candidate fingerprints from a portion of an unidentified recording, the first candidate fingerprint having a candidate frequency variation from an original recording, the second candidate fingerprint having a candidate amplitude variation from the original recording, wherein the processor is to compare the first candidate fingerprint with the first reference fingerprint and the second candidate fingerprint with the second reference fingerprint to find a match for the unidentified recording among reference recordings, the first reference fingerprint having a reference frequency variation from the original recording and the second reference fingerprint having a reference amplitude variation from the original recording.

20. The system of claim 19, wherein the processor is to combine first and second results to determine whether the first and second reference fingerprints correspond to the first and second candidate fingerprints, the first result arising from the comparison of the first candidate fingerprint with the first reference fingerprint and the second result arising from the comparison of the second candidate fingerprint with the second reference fingerprint.

21. The system of claim 19, wherein the portion of the unidentified recording has a duration of less than five seconds.

22. A system comprising:

a storage unit to store an audio sample of an unidentified recording; and a processor communicatively coupled to the storage unit, the processor to determine overlapping audio frames from the audio sample, to extract frequency spectra of the audio sample corresponding to at least one of the overlapping audio frames, to modify the frequency spectra using an ear model transfer function to generate weighted frequency spectra, to generate a matrix of power values based on the weighted frequency spectra, the matrix having a time dimension and a frequency dimension, to transform a normalized version of the matrix of power values to a log scale set of transformed values, and to generate a candidate fingerprint for the audio sample based on the transformed values.

23. The system of claim 22, wherein the processor is to extract the frequency spectra by applying a discrete cosine transform to the audio sample, wherein the overlapping audio frames have a substantially uniform duration, and wherein at least some of the overlapping audio frames overlap by about half of the substantially uniform duration.

24. The system of claim 22, wherein the storage unit is to store a reference fingerprint of a reference recording, and wherein the processor is to identify the unidentified recording based on a comparison of the candidate fingerprint to the reference fingerprint.

25. A system comprising:

a storage unit to store a plurality of reference fingerprints; and a processor communicatively coupled to the storage unit, the processor to partition a portion of an unidentified recording into time-frequency regions covering at least one of at least three ranges of time and one of at least three ranges of frequency, to weight the time-frequency regions to produce weighted time-frequency regions, to compute a candidate value of a candidate fingerprint using the weighted time-frequency regions, and to determine that the candidate value matches a reference value corresponding to one of the plurality of reference fingerprints.

26. The system of claim 25, wherein the processor is to weight the time-frequency regions by emphasizing a particular time-frequency region covering at least one of a substantially central range of time or a substantially central range of frequency included in the time-frequency regions.

27. The system of claim 25, wherein the processor is to identify the unidentified recording based on a determination that the candidate value matches the reference value.

28. A system comprising:

a storage unit to store a reference recording; and a processor communicatively coupled to the storage unit, the processor to extract a principal fingerprint from a principal portion of the reference recording, to extract auxiliary fingerprints from auxiliary portions of the reference recording, the auxiliary portions being separated in time by a substantially regular interval, to compute reference parameters based on the principal fingerprint and on the auxiliary fingerprints, to generate a reference fingerprint of the reference recording, the reference fingerprint including the principal fingerprint and the reference parameters, and to store the reference fingerprint, wherein the processor is to extract an initial fingerprint from an initial portion an unknown recording, to extract subsequent fingerprints from subsequent portions of the unknown recording, the subsequent portions following the initial portion in time and being separated by the substantially regular time interval, to compute candidate parameters based on the initial fingerprint and on the subsequent fingerprints, to generate a candidate fingerprint of the unknown recording, the candidate fingerprint including the initial fingerprint and the candidate parameters, and to identify the unknown recording based on a correlation between the reference fingerprint and the candidate fingerprint.

29. The system of claim 28, wherein the reference parameters comprise reference distance measures from the principal fingerprint to each of the auxiliary fingerprints.

30. The system of claim 28, wherein the reference parameters comprises reference power differences between the principal portion and each of the auxiliary portions.

31. The system of claim 28, wherein the candidate parameters comprise candidate distance measures from the initial candidate fingerprint to the subsequent fingerprints.

32. The system of claim 28, wherein the candidate parameters comprise candidate power differences between the initial portion and the subsequent portions.

* * * * *